US012594958B2

(12) United States Patent
Biswas et al.

(10) Patent No.: US 12,594,958 B2
(45) Date of Patent: Apr. 7, 2026

(54) MOTION PLANNING WITH IMPLICIT OCCUPANCY FOR AUTONOMOUS SYSTEMS

(71) Applicant: Waabi Innovation Inc., Toronto (CA)

(72) Inventors: Sourav Biswas, Toronto (CA); Sergio Casas Romero, Toronto (CA); Quinlan Skyora, Toronto (CA); Ben Taylor Caldwell Agro, Toronto (CA); Abbas Sadat, Toronto (CA); Raquel Urtasun, Toronto (CA)

(73) Assignee: Waabi Canada Inc., Toronto (CA)

( * ) Notice: Subject to any disclaimer, the term of this patent is extended or adjusted under 35 U.S.C. 154(b) by 78 days.

(21) Appl. No.: 18/598,961

(22) Filed: Mar. 7, 2024

(65) Prior Publication Data

US 2024/0300526 A1 Sep. 12, 2024

Related U.S. Application Data

(60) Provisional application No. 63/450,637, filed on Mar. 7, 2023.

(51) Int. Cl.
*G01C 21/30* (2006.01)
*B60W 60/00* (2020.01)

(52) U.S. Cl.
CPC ........... *B60W 60/001* (2020.02); *G01C 21/30* (2013.01); *B60W 2556/40* (2020.02)

(58) Field of Classification Search
CPC .. B60W 2556/40; B60W 60/001; G01C 21/30
See application file for complete search history.

(56) References Cited

U.S. PATENT DOCUMENTS

| | | | | |
|---|---|---|---|---|
| 11,348,452 B2 * | 5/2022 | Mubarek | .......... | G08G 1/096827 |
| 11,624,629 B2 * | 4/2023 | Dorum | ................... | G01C 21/30 |
| | | | | 701/533 |
| 2012/0209507 A1 * | 8/2012 | Serbanescu | .......... | G01C 21/005 |
| | | | | 701/410 |
| 2019/0360818 A1 * | 11/2019 | Linder | ................... | G01C 21/30 |
| | (Continued) | | | |

OTHER PUBLICATIONS

Casas, S., et al., "MP3: A Unified Model to Map, Perceive, Predict and Plan", https://arxiv.org/pdf/2101.06806, Jan. 18, 2021, 22 pages.

(Continued)

*Primary Examiner* — Tyler J Lee
(74) *Attorney, Agent, or Firm* — Lathrop GPM LLP

(57) ABSTRACT

Motion planning with implicit occupancy for autonomous systems includes obtaining a set of trajectories through a geographic region for an autonomous system, and generating, for each trajectory in the set of trajectories, a set of points of interest in the geographic region to obtains sets of points of interest. Motion planning further includes quantizing the sets of points of interest to obtain a set of query points in the geographic region and querying the implicit decoder model with the set of query points to obtain point attributes for the set of query points. Motion planning further includes processing, for each trajectory of a least a subset of trajectories, the point attributes corresponding to the set of points of interest to obtain a trajectory cost for the trajectory. From the set of trajectories, a selected trajectory is selected according to trajectory cost.

20 Claims, 14 Drawing Sheets

(56) References Cited

U.S. PATENT DOCUMENTS

| | | | | |
|---|---|---|---|---|
| 2019/0376795 | A1* | 12/2019 | Linder | H04W 4/40 |
| 2020/0026279 | A1* | 1/2020 | Rhodes | G01C 21/3697 |
| 2020/0111348 | A1* | 4/2020 | Gentile | G08G 1/0112 |
| 2021/0095975 | A1* | 4/2021 | Mubarek | G08G 1/0141 |
| 2021/0150896 | A1* | 5/2021 | Rakshit | G08G 1/20 |
| 2021/0241614 | A1* | 8/2021 | Mubarek | G08G 1/096827 |
| 2021/0302194 | A1* | 9/2021 | Dorum | G01C 21/3446 |
| 2022/0204050 | A1* | 6/2022 | Taveira | G01C 21/3423 |

OTHER PUBLICATIONS

Sadat, A., et al., "Perceive, Predict, and Plan: Safe Motion Planning Through Interpretable Semantic Representations", https://arxiv.org/pdf/2008.05930, Aug. 13, 2020, 28 pages.

* cited by examiner

Feature Map
400

Second
Axis
of Birds
Eye View
404

First Axis of Birds Eye View
402

Feature Vector Axis
406

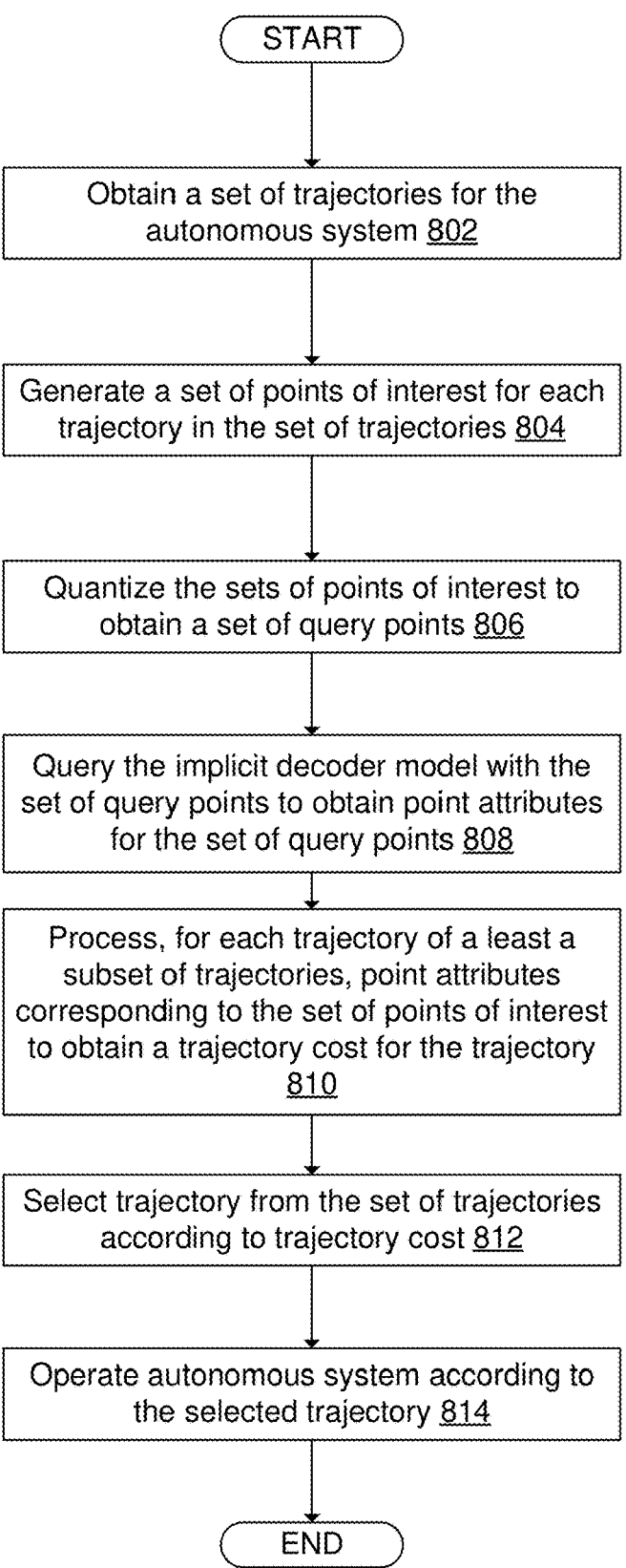

START

Obtain a set of trajectories for the autonomous system 802

Generate a set of points of interest for each trajectory in the set of trajectories 804

Quantize the sets of points of interest to obtain a set of query points 806

Query the implicit decoder model with the set of query points to obtain point attributes for the set of query points 808

Process, for each trajectory of a least a subset of trajectories, point attributes corresponding to the set of points of interest to obtain a trajectory cost for the trajectory 810

Select trajectory from the set of trajectories according to trajectory cost 812

Operate autonomous system according to the selected trajectory 814

END

*FIG. 8*

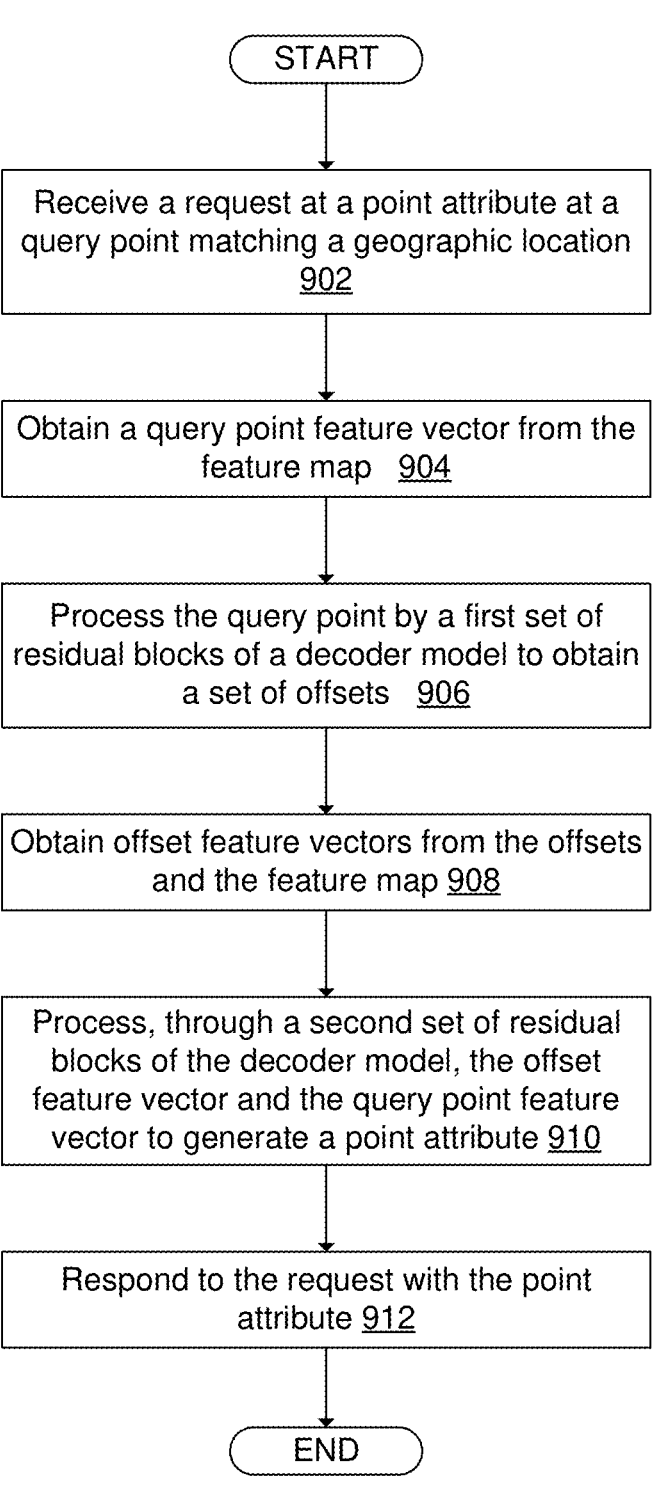

START

Receive a request at a point attribute at a query point matching a geographic location 902

Obtain a query point feature vector from the feature map  904

Process the query point by a first set of residual blocks of a decoder model to obtain a set of offsets  906

Obtain offset feature vectors from the offsets and the feature map 908

Process, through a second set of residual blocks of the decoder model, the offset feature vector and the query point feature vector to generate a point attribute 910

Respond to the request with the point attribute 912

END

*FIG. 9*

1400
Computing
System

1412
Output Device(s)

1404
Non-Persistent
Storage

1402
Computer
Processor(s)

1406
Persistent
Storage

1408
Communication
Interface

1410
Input Device(s)

1420
Network

1422
Node X

1424
Node Y

1426
Client Device

MOTION PLANNING WITH IMPLICIT OCCUPANCY FOR AUTONOMOUS SYSTEMS

CROSS REFERENCE TO RELATED APPLICATIONS

This application is a non-provisional application of, and thereby claims benefit under 35 U.S.C. § 119(e) to, U.S. Patent Application Ser. No. 63/450,637 filed on Mar. 7, 2023. U.S. Patent Application Ser. No. 63/450,637 is incorporated herein by reference in its entirety.

BACKGROUND

An autonomous system is a self-driving mode of transportation that does not require a human pilot or human driver to move in and react to the real-world environment. Rather, the autonomous system includes a virtual driver that is the decision making portion of the autonomous system. Specifically, the virtual driver controls the actuation of the autonomous system. The virtual driver is an artificial intelligence system that learns how to interact in the real world and then performs the interaction when in the real world.

Part of interacting in the real world is collision avoidance with other objects in the environment. To more safely navigate the real-world environment autonomously, predictions have to be not only accurate and generalize across many scenarios, but also made in a timely manner so that the autonomous system can react appropriately.

To make predictions as to where objects will be in the future, object-based systems detect objects in the region, and then predict where the objects will be in the future. Another technique is an object free approach. An object free approach divides a region into grid cells and then predicts, for each grid cell and each timestep in the future, whether the grid cell is occupied. After predicting each grid cell, the autonomous system selects a trajectory that is through an unoccupied path.

SUMMARY

In general, in one aspect, one or more embodiments relate to a method that includes obtaining a set of trajectories through a geographic region for an autonomous system, and generating, for each trajectory in the set of trajectories, a set of points of interest in the geographic region to obtains sets of points of interest. The method further includes quantizing the sets of points of interest to obtain a set of query points in the geographic region and querying the implicit decoder model with the set of query points to obtain point attributes for the set of query points. The method further includes processing, for each trajectory of a least a subset of trajectories, the point attributes corresponding to the set of points of interest to obtain a trajectory cost for the trajectory. From the set of trajectories, a selected trajectory is selected according to trajectory cost.

In general, in one aspect, one or more embodiments relate to a system that includes a computer processor and a non-transitory computer readable medium for causing the computer processor to perform operations. The operations include obtaining a set of trajectories through a geographic region for an autonomous system, and generating, for each trajectory in the set of trajectories, a set of points of interest in the geographic region to obtains sets of points of interest. The operations further include quantizing the sets of points of interest to obtain a set of query points in the geographic region and querying the implicit decoder model with the set of query points to obtain point attributes for the set of query points. The operations further include processing, for each trajectory of a least a subset of trajectories, the point attributes corresponding to the set of points of interest to obtain a trajectory cost for the trajectory. From the set of trajectories, a selected trajectory is selected according to trajectory cost.

In general, in one aspect, one or more embodiments relate to a non-transitory computer readable medium that include computer readable program code for causing a computer system to perform operations. The operations include obtaining a set of trajectories through a geographic region for an autonomous system, and generating, for each trajectory in the set of trajectories, a set of points of interest in the geographic region to obtains sets of points of interest. The operations further include quantizing the sets of points of interest to obtain a set of query points in the geographic region and querying the implicit decoder model with the set of query points to obtain point attributes for the set of query points. The operations further include processing, for each trajectory of a least a subset of trajectories, the point attributes corresponding to the set of points of interest to obtain a trajectory cost for the trajectory. From the set of trajectories, a selected trajectory is selected according to trajectory cost.

Other aspects of the invention will be apparent from the following description and the appended claims.

BRIEF DESCRIPTION OF DRAWINGS

FIG. 8 shows a flowchart for motion planning with implicit occupancy in accordance with one or more embodiments of the invention.

FIG. 9 shows a flowchart for implicit occupancy determination in accordance with one or more embodiments of the invention.

Like elements in the various figures are denoted by like reference numerals for consistency.

DETAILED DESCRIPTION

Figure 1:
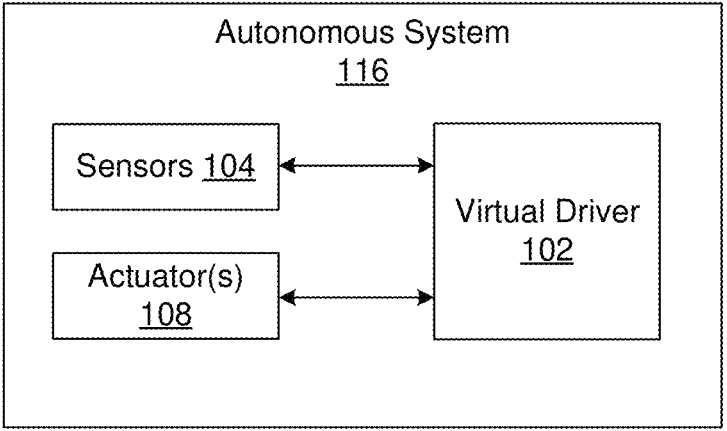
FIG. 1 shows an autonomous system with a virtual driver in accordance with one or more embodiments.

In general, embodiments are directed to motion planning of an autonomous system with implicit occupancy. Motion planning involves repetitively selecting a trajectory for the autonomous system. As new sensor data is received, a new trajectory is selected, and the autonomous system continues to move along the new trajectory.

One or more embodiments select trajectories based on implicit occupancy of a geographic region. In particular, the geographic region includes physical objects (e.g., the agents and other physical objects) and various map elements. The agents are the actors in the geographic regions that are capable of independent decision making and movement while the other physical objects may be stationary or transitory items that may or may not move. The map elements are physical portions of the geographic region that may be reflected in a map of the geographic region. The physical objects may be located at various geographic locations in the geographic region. Whether an object is located at a geographic location is the occupancy of the geographic location. Namely, occupancy for a geographic location is a binary question of whether the geographic location will or will not be occupied at a particular point in time. The determination of occupancy is important for an autonomous system because if an autonomous system moves to an occupied geographic location, then a collision occurs.

At any given moment, an autonomous system may select from hundreds to thousands of trajectories. To select a trajectory, the trajectories are discretized into sequence of geographic positions at corresponding timesteps. By way of an example only, the timesteps may be up to five seconds in the future. For each trajectory, the geographic positions may be defined bounding boxes. The bounding boxes may be discretized into points of interest. Each point corresponds to a geographic location. Points of interest are defined at a high resolution. To narrow the number of locations considered, the points of interest are quantized onto a grid having grid cells. The grid is at a lower resolution than the points of interest. The quantization process for one or more trajectories creates a set of query points. Each query point includes a geographic location and a corresponding time in which the autonomous vehicle following the trajectory would be at the query point.

The set of query points are passed to an implicit decoder model. The implicit decoder model processes the query points to generate point attributes. For example, the point attributes may be the probability of occupancy at the location of the query point. The point attributes may be the flow direction and flow magnitude at the location. The returned point attributes are then used to generate a trajectory cost for each trajectory by relating the point attributes to the point of interest for the trajectory. Based on the trajectory cost of the trajectories, the trajectory is selected.

In one or more embodiments, the implicit decoder model predicts whether a particular geographic location in the geographic region will be occupied without consideration of a particular agent or physical object performing the occupying. In determining whether an autonomous system is safe to move to a particular location, embodiments effectively combine the identification of the objects, corresponding trajectories, and whether the corresponding trajectories include the geographic location into a single prediction of whether the geographic location will be occupied.

One or more embodiments may perform the prediction for the set of query points without performing a prediction of the overall grid. The query point is used as an input to the various machine learning models that determine the implicit occupancy. In one or more embodiments, the occupancy for only a subset of geographic locations is determined rather than building an occupancy grid and performing a lookup in the occupancy grid. By not building an entire occupancy grid, computing resources may be saved. Further, whereas an occupancy grid has a fixed resolution, the query point is not limited to a fixed position and size in one or more embodiments.

Figure 2:
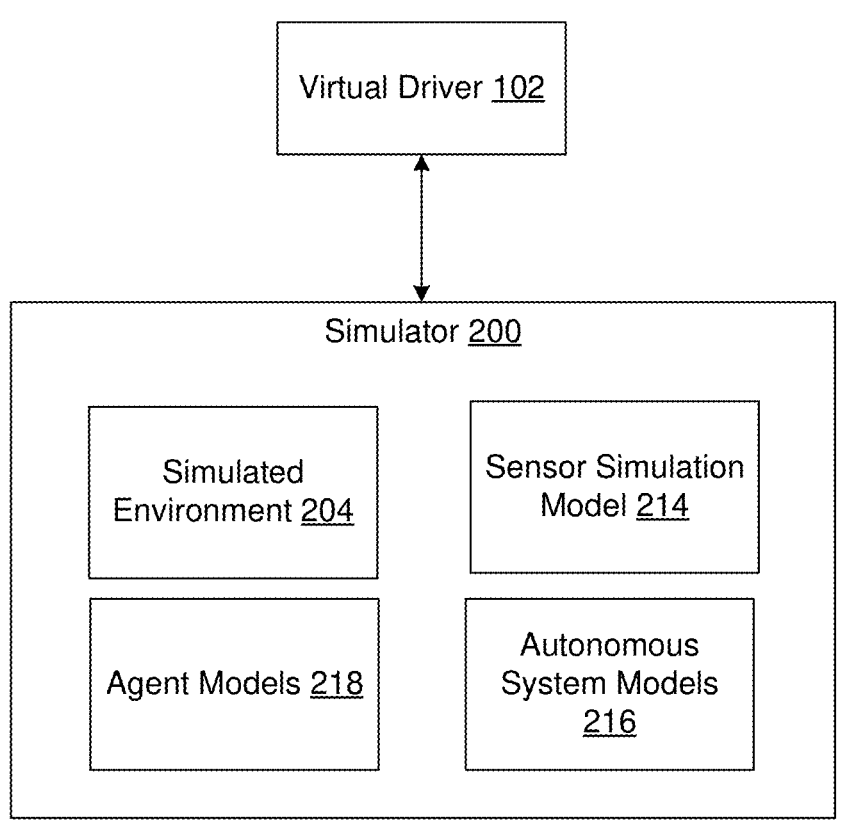
FIG. 2 shows a simulation environment for training a virtual driver of an autonomous system in accordance with one or more embodiments of the invention.

Turning to the Figures, FIG. 1 and FIG. 2 show example diagrams of the autonomous system and virtual driver. Turning to FIG. 1, an autonomous system (116) is a self-driving mode of transportation that does not require a human pilot or human driver to move and react to the real-world environment. The autonomous system (116) may be completely autonomous or semi-autonomous. As a mode of transportation, the autonomous system (116) is contained in a housing configured to move through a real-world environment. Examples of autonomous systems include self-driving vehicles (e.g., self-driving trucks and cars), drones, airplanes, robots, etc.

The autonomous system (116) includes a virtual driver (102) that is the decision-making portion of the autonomous system (116). The virtual driver (102) is an artificial intelligence system that learns how to interact in the real world and interacts accordingly. The virtual driver (102) is the software executing on a processor that makes decisions and causes the autonomous system (116) to interact with the real-world including moving, signaling, and stopping or maintaining a current state. Specifically, the virtual driver (102) is decision making software that executes on hardware (not shown). The hardware may include a hardware processor, memory or other storage device, and one or more interfaces. A hardware processor is any hardware processing unit that is configured to process computer readable program code and perform the operations set forth in the computer readable program code.

A real-world environment is the portion of the real world through which the autonomous system (116), when trained, is designed to move. Thus, the real-world environment may include concrete and land, construction, and other objects in a geographic region along with agents. The agents are the other agents in the real-world environment that are capable of moving through the real-world environment. Agents may have independent decision-making functionality. The independent decision-making functionality of the agent may dictate how the agent moves through the environment and may be based on visual or tactile cues from the real-world environment. For example, agents may include other autonomous and non-autonomous transportation systems (e.g., other vehicles, bicyclists, robots), pedestrians, animals, etc.

In the real world, the geographic region is an actual region within the real-world that surrounds the autonomous system. Namely, from the perspective of the virtual driver, the geographic region is the region through which the autonomous system moves. The geographic region includes agents and map elements that are located in the real world. Namely, the agents and map elements each have a physical location in the geographic region that denotes a place in which the corresponding agent or map element is located. The map elements are stationary in the geographic region, whereas the agents may be stationary or nonstationary in the geographic region. The map elements are the elements shown in a map (e.g., road map, traffic map, etc.) or derived from a map of the geographic region.

The real-world environment changes as the autonomous system (116) moves through the real-world environment. For example, the geographic region may change, and the agents may move positions, including new agents being added and existing agents leaving.

In order to interact with the real-world environment, the autonomous system (116) includes various types of sensors (104), such as LiDAR sensors amongst other types, which are used to obtain measurements of the real-world environment, and cameras that capture images from the real-world environment. The autonomous system (116) may include other types of sensors as well. The sensors (104) provide input to the virtual driver (102).

In addition to sensors (104), the autonomous system (116) includes one or more actuators (108). An actuator is hardware and/or software that is configured to control one or more physical parts of the autonomous system based on a control signal from the virtual driver (102). In one or more embodiments, the control signal specifies an action for the autonomous system (e.g., turn on the blinker, apply breaks by a defined amount, apply accelerator by a defined amount, turn the steering wheel or tires by a defined amount, etc.). The actuator(s) (108) are configured to implement the action. In one or more embodiments, the control signal may specify a new state of the autonomous system and the actuator may be configured to implement the new state to cause the autonomous system to be in the new state. For example, the control signal may specify that the autonomous system should turn by a certain amount while accelerating at a predefined rate, while the actuator determines and causes the wheel movements and the amount of acceleration on the accelerator to achieve a certain amount of turn and acceleration rate.

The testing and training of the virtual driver (102) of the autonomous systems in the real-world environment is unsafe because of the accidents that an untrained virtual driver can cause. Thus, as shown in FIG. 2, a simulator (200) is configured to train and test a virtual driver (102) of an autonomous system. For example, the simulator may be a unified, modular, mixed-reality, closed-loop simulator for autonomous systems. The simulator (200) is a configurable simulation framework that enables not only evaluation of different autonomy components of the virtual driver (102) in isolation, but also as a complete system in a closed-loop manner. The simulator reconstructs "digital twins" of real-world scenarios automatically, enabling accurate evaluation of the virtual driver at scale. The simulator (200) creates the simulated environment (204) which is a virtual world in which the virtual driver (102) is a player in the virtual world. The simulated environment (204) is a simulation of a real-world environment, which may or may not be in actual existence, in which the autonomous system is designed to move. As such, the simulated environment (204) includes a simulation of the objects (i.e., simulated objects or agents) and background in the real world, including the natural objects, construction, buildings and roads, obstacles, as well as other autonomous and non-autonomous objects. The simulated environment simulates the environmental conditions within which the autonomous system may be deployed. The simulated objects may include both stationary and non-stationary objects. Non-stationary objects are agents in the real-world environment.

In the simulated environment, the geographic region is a realistic representation of a real-world region that may or may not be in actual existence. Namely, from the perspective of the virtual driver, the geographic region appears the same as if the geographic region were in existence if the geographic region does not actually exist, or the same as the actual geographic region present in the real world. The geographic region in the simulated environment includes virtual agents and virtual map elements that would be actual agents and actual map elements in the real world. Namely, the virtual agents and virtual map elements each have a physical location in the geographic region that denotes an exact spot or place in which the corresponding agent or map element is located. The map elements are stationary in the geographic region, whereas the agents may be stationary or nonstationary in the geographic region. As with the real-world, a map exists of the geographic region that specifies the physical locations of the map elements.

The simulator (200) includes an autonomous system model (216), sensor simulation models (214), and agent models (218). The autonomous system model (216) is a detailed model of the autonomous system in which the virtual driver (102) will execute. The autonomous system model (216) includes model, geometry, physical parameters (e.g., mass distribution, points of significance), engine parameters, sensor locations and type, firing pattern of the sensors, information about the hardware on which the virtual driver executes (e.g., processor power, amount of memory, and other hardware information), and other information about the autonomous system. The various parameters of the autonomous system model may be configurable by the user or another system.

The autonomous system model (216) includes an autonomous system dynamic model. The autonomous system dynamic model is used for dynamics simulation that takes the actuation actions of the virtual driver (e.g., steering angle, desired acceleration) and enacts the actuation actions on the autonomous system in the simulated environment to update the simulated environment and the state of the autonomous system. The interface between the virtual driver (102) and the simulator (200) may match the interface between the virtual driver (102) and the autonomous system in the real world. Thus, to the virtual driver (102), the simulator simulates the experience of the virtual driver within the autonomous system in the real world.

In one or more embodiments, the sensor simulation model (214) models, in the simulated environment, active and passive sensor inputs. The sensor simulation models (114) are configured to simulate the sensor observations of the surrounding scene in the simulated environment (204) at each time step according to the sensor configuration on the vehicle platform. Passive sensor inputs capture the visual appearance of the simulated environment including stationary and nonstationary simulated objects from the perspective of one or more cameras based on the simulated position of the camera(s) within the simulated environment. Examples of passive sensor inputs include inertial measurement unit (IMU) and thermal. Active sensor inputs are inputs to the virtual driver of the autonomous system from the active sensors, such as LiDAR, RADAR, global positioning system (GPS), ultrasound, etc. Namely, the active sensor inputs include the measurements taken by the sensors, and the measurements being simulated based on the simulated environment based on the simulated position of the sensor(s) within the simulated environment.

Agent models (218) represents an agent in a scenario. An agent is a sentient being that has an independent decision-making process. Namely, in a real world, the agent may be an animate being (e.g., person or animal) that makes a decision based on an environment. The agent makes active movement rather than or in addition to passive movement. An agent model, or an instance of an actor model may exist for each agent in a scenario. The agent model is a model of the agent. If the agent is in a mode of transportation, then the agent model includes the model of transportation in which the agent is located. For example, actor models may represent pedestrians, children, vehicles being driven by drivers, pets, bicycles, and other types of actors.

Figure 3:
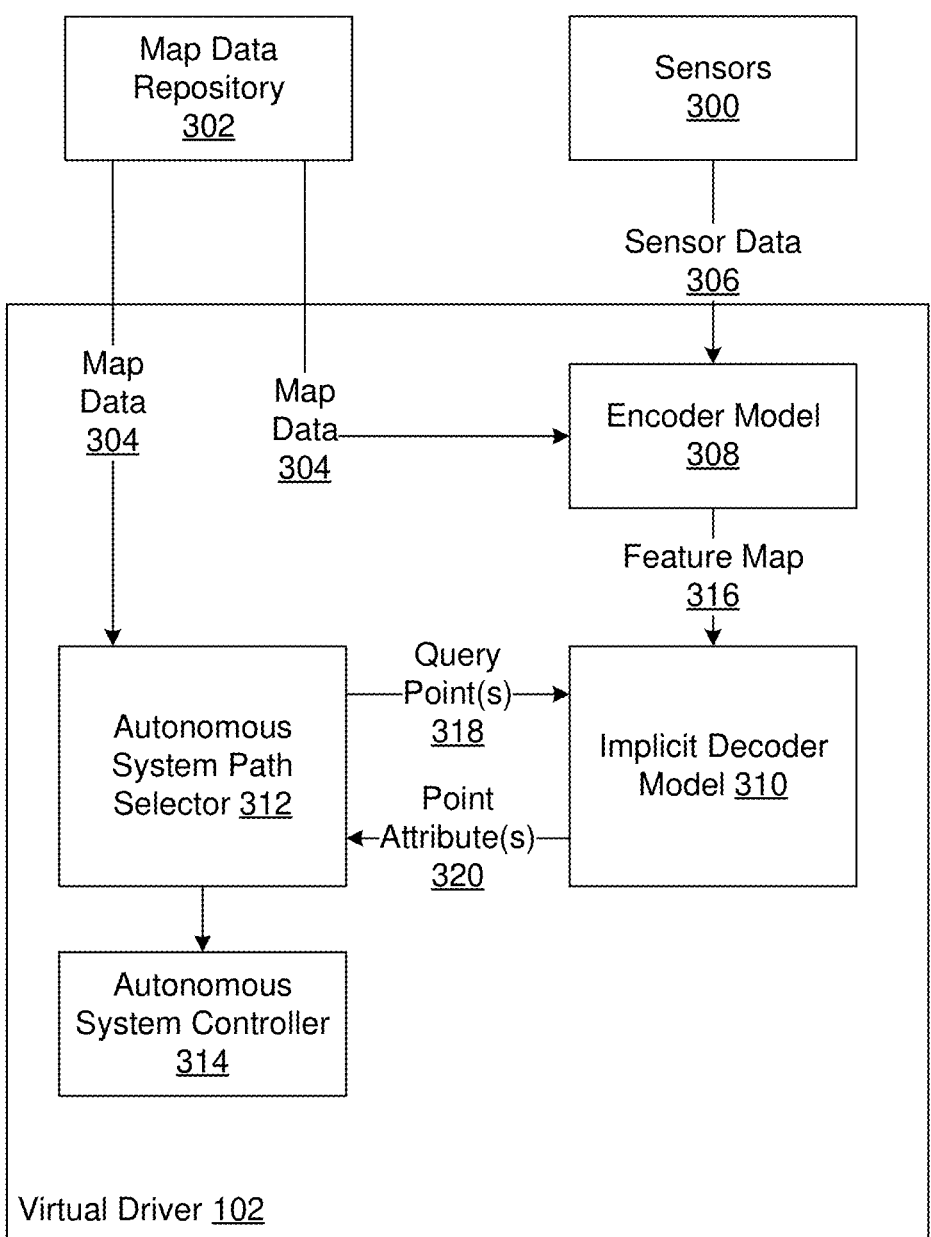
FIG. 3 shows a diagram of components of a virtual driver in accordance with one or more embodiments of the invention.

FIG. 3 shows a schematic diagram of the virtual driver (102) having an implicit occupancy system in accordance with one or more embodiments. As shown in FIG. 3, the virtual driver (102) is connected to a map data repository (302) and sensors (300). The map data repository (302) is a storage repository for map data (304). The map data (304) is a map of the geographic region with map elements, described above, located at their respective geographic locations in the map. For example, the map data may include the centerlines of lanes and roadways at their corresponding positions on a map.

The sensors (300) are virtual sensors (e.g., sensor simulation model (214) as described in FIG. 2) or physical sensors (e.g., sensors (104) described in FIG. 1). The sensors provide sensor data (306). Sensor data (306) may include LiDAR sweeps, LiDAR point clouds, camera images, or other types of sensor data. A LiDAR sweep provides a set of LiDAR points radiating outward from a LiDAR sensor. A LiDAR point cloud is a set of LiDAR points at corresponding locations.

Continuing with FIG. 3, the virtual driver (102) includes an encoder model (308), an implicit decoder model (310), an autonomous system path selector (312), and an autonomous system controller (314). Each of these components is described below.

Figure 4:
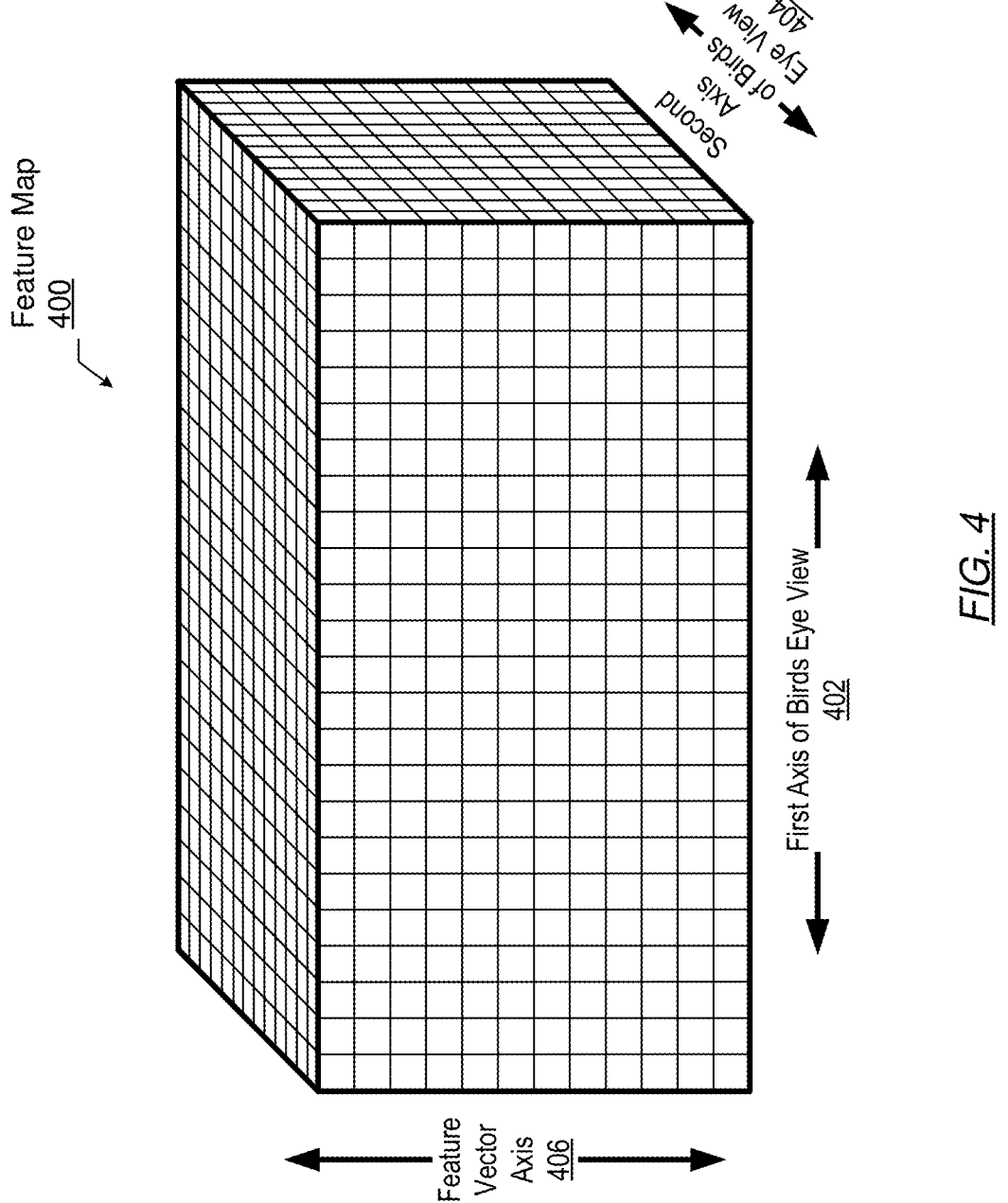
FIG. 4 shows a diagram of a feature map in accordance with one or more embodiments of the invention.

The encoder model (308) is a machine learning model configured to obtain sensor data (306) from the sensors (300), map data (304) from the map data repository (302) and generate a feature map (316) of the geographic region. The encoder model is a machine learning model or a collection of machine learning models that encodes the sensor data (306) and the map data (304) into the feature map (316). Specifically, the encoder model is designed to learn vector embeddings for the sensor data (306) and map data (304) that is used for prediction of point attributes at a variety of not yet specified times. A feature map (316) is a map of the geographic region with at least one axis having feature vectors for corresponding locations in the geographic region. The feature vectors are the vector embeddings. A feature map (316) is an encoding of the current and past states of the geographic region. In one or more embodiments, the feature map (316) does not include future occupancy information. An example of a feature map (316) is shown in FIG. 4.

Continuing with FIG. 3, an implicit decoder model (310) is a machine learning model configured to obtain a set of one or more query points (318) and output a set of one or more point attributes (320) for each of the query points (318). The implicit decoder model (310) is a neural network model that is configured to obtain and decode feature vectors from the feature map for a query point. A query point may include an identification of a geographic location and a time value. The time value is the future time for which the set of point attributes (320) is to be predicted. Further, the time may be specified relative to a current time. For example, the time value may be a few seconds in the future.

The point attributes (320) are attributes of the geographic location at the specified point in time. For example, the point attributes (320) may include the binary value of occupied or not occupied, a probability value of occupied or not occupied, a reverse flow vector specifying from where the object or agent occupying the geographic location came and magnitude of flow, an object type identifier, an object type identifier or other attribute of the geographic point. An object type identifier may be an identifier of the type of object performing the occupancy without identifying the object or trajectory of the object itself. For autonomous systems that are vehicles, the object type identifier may be pedestrian, truck, car, bicyclist, etc.

The autonomous system path selector (312) is configured to select a path for the autonomous system using map data (304). A path is a sequence of trajectories. The trajectory is a series of geographic positions and acceleration or speed. As the autonomous system moves, the geographic region changes. Other actors and other objects may move in the geographic region causing the change in the geographic region. The sensor data reflects the change of the geographic region. As the sensor data changes, the trajectory costs of the various trajectories change. Thus, the autonomous system path selector (312) is configured to iteratively replace the previous selected trajectory with a new trajectory as the trajectory costs change. The iterative changing of the trajectory creates a path of the autonomous system through the changing geographic region. For example, the path may include slowing down in the previously defined trajectory, turning, accelerating, decelerating, waiting, or performing another action. The autonomous system path selector (312) may use routing information, point attributes (320), and other inputs to select a path.

The autonomous system controller (314) is a software process configured to send a control signal to an actuator of the autonomous system. The autonomous system controller (314) is configured to determine an action for the autonomous system to perform the path of the autonomous system path selector.

FIGS. 4-7 shows an example expanded form of various components of FIG. 3 in accordance with one or more embodiments. FIG. 4 shows a diagram of a three-dimensional feature map (400) in accordance with one or more embodiments of the invention. The feature map of FIG. 4 may correspond to the feature map (316) shown in FIG. 3.

In the feature map (400) of FIG. 4, a first and second dimensions correspond to a birds eye view of the geographic region. A birds eye view may also be referred to as an aerial perspective view or a top down view of the geographic region. Specifically, a first axis of the feature map (400) is a first axis of the birds eye view (402), and the second axis of the feature map is a second axis of the birds eye view (404). For example, the first axis may correspond to East-West axis of the geographic region, and the second axis may correspond to a North-South axis of the geographic region. The first and second axes may correspond to different axes of the geographic region. As such, the plane formed by the first and second axis may match a road map or traffic map of the geographic region.

Further, the feature map is a multi-dimensional grid. A grid is a partitioning of a region into cells. In the three-dimensional feature map of FIG. 4, two dimensions of the three-dimensional grid that corresponds to the first and second axes partition the geographic region into discrete grid cells. Thus, each geographic location in the geographic region is within a particular grid cell. The third dimension corresponds to a third axis of the feature map that is a feature vector axis (406). The feature vector axis has an individual corresponding feature vector for each grid cell of the first and second axis. A one-to-one mapping may exist between the feature map and grid cells of the other dimensions. A feature vector is a vector of feature values. In one or more embodiments, the feature vector is a fixed size. Taken together, the feature map partitions the geographic region into sub-regions, whereby each subregion has a corresponding feature vector.

Although FIG. 4 shows a three-dimensional feature map, a four-dimensional feature map may be used. For example, if the autonomous system is an aircraft, three dimensions may be geographic locations in three-dimensional space and the fourth dimension may be the feature vector.

Figure 5:
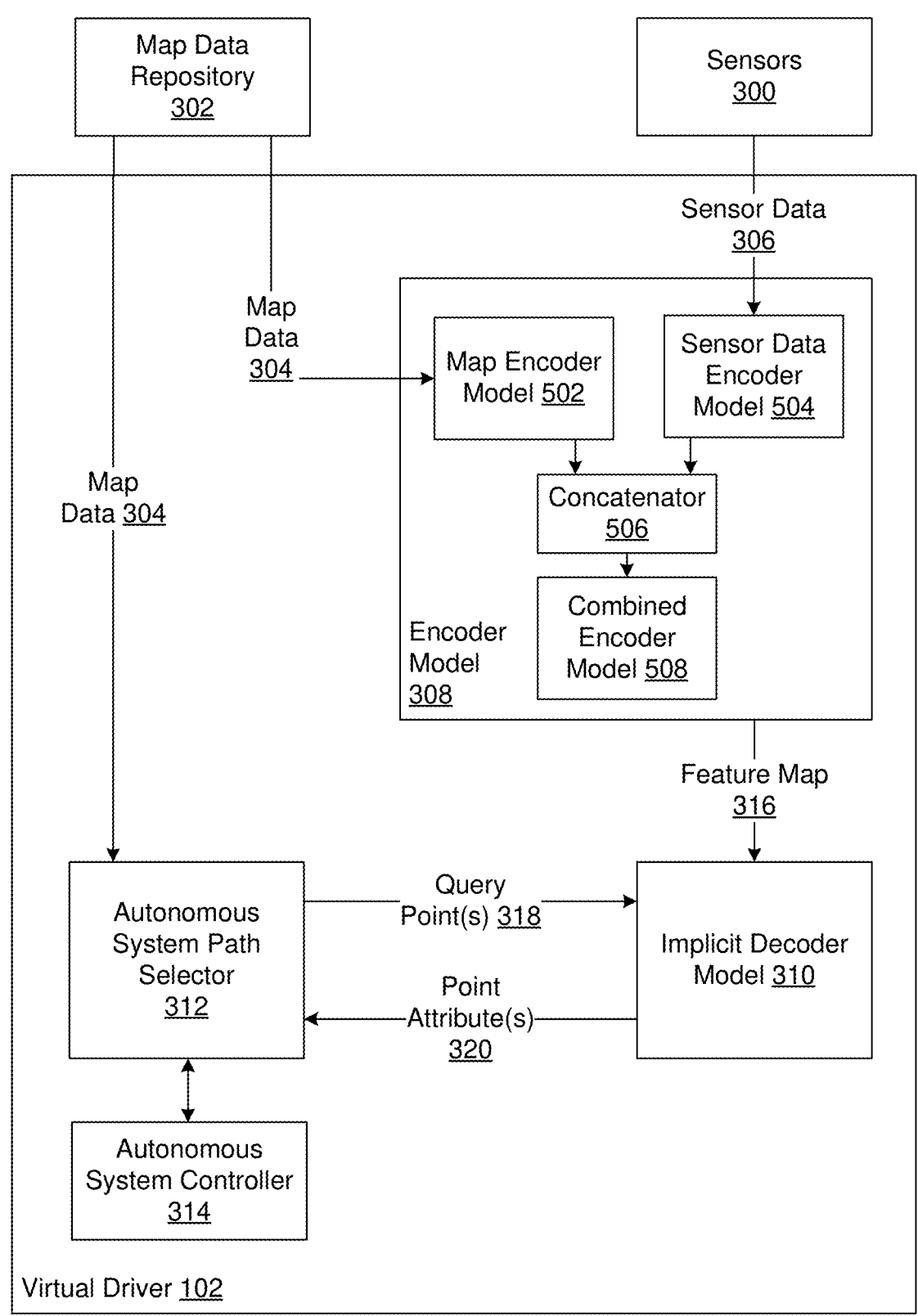
FIG. 5 shows a diagram of components of a virtual driver with an exploded view of the encoder model in accordance with one or more embodiments of the invention.

FIG. 5 shows a diagram of components of a virtual driver with an exploded view of the encoder model (308) in accordance with one or more embodiments of the invention. Components of FIG. 5 that have the same reference number as like-named components of FIG. 3 are the same as or similar to the like-named components.

As shown in FIG. 5, the encoder model (308) may be a particular combination of multiple models. The encoder model (308) may include a map encoder model (502), a sensor data encoder model (504), a concatenator (506), and a combined encoder model (508). The map encoder model (502) is a machine learning model that is configured to transform map data into map feature vectors for each sub-region of the geographic region. Specifically, as discussed above with reference to FIG. 4, the feature map partitions the geographic region into sub-regions, where each sub-region corresponds to a grid cell on two of the dimensions of the three-dimensional grid of the feature map. The map encoder model (502) generates a map encoding of the map that is used for the map feature vectors. Thus, the output of the map encoder model (502) is a map feature map, such as similar to that which is described above with reference to FIG. 4, but with only map data features. An example of a map encoding model may be or may include a convolutional neural network.

The sensor data encoder model (504) is configured to encode sensor data (306). If the sensor data is LiDAR, the LiDAR data may be received as a list of LiDAR points. LiDAR points in the list may be voxelized in a three-dimensional LiDAR grid, where each grid cell is for a geographic location. For each grid cell of the LiDAR grid, the value of the grid cell may be set to one if a LiDAR point exists in the list that identifies the grid cell or zero if no point exists. The result of the voxelizing is a binary three-dimensional grid for the geographic region specifying where the LiDAR points are located. Multiple LiDAR sweeps may be combined or voxelized in the same LiDAR grid. In such a scenario, a grid cell of the LiDAR grid may be set to one if any of the LiDAR points in any of the LiDAR sweeps identifies the geographic location of the grid cell. Thus, if multiple LiDAR sweeps are combined, current or historical sweeps, then the LiDAR may also reflect an immediate preceding occupation of the three-dimensional geographic region. Although binary values for the grid cells of the LiDAR grid are described, the values of the grid cells may be set based on the elapse time from when the LiDAR sweep was performed. Further, rather than a three-dimensional LiDAR grid, a two dimensional LiDAR grid may be used whereby the third dimension is projected on the birds eye view.

The sensor data encoder model (504) may then generate a vector embedding of the LiDAR grid. The vector embedding is a sensor data feature vector for each grid cell of a birds eye view of the geographic region in one or more embodiments. Namely, the output of the sensor data encoder model (504) is a sensor data feature map, such as similar to the feature map described in reference to FIG. 4, but with only sensor data features. The sensor data encoder model (504) may be a convolutional neural network.

A concatenator (506) is configured to concatenate each map feature vector with the corresponding sensor data feature vector to generate a concatenated feature vector. Two feature vectors correspond when the two feature vectors are for the same sub-region of the geographic region. The concatenation feature vector may have a first portion of the map feature vector and a second portion of the sensor data feature vector. Stated another way, the map feature map and the sensor data feature map may have the same resolution in terms of the dimensions that correspond to the geographic region. The concatenator may overlay the map feature map on the sensor data feature map to generate a concatenated feature map. Thus, the concatenated feature vector has a latent description of the geometry (i.e., as specified in the map data) of the geographic region and the motion around the geographic region.

The combined encoder model (508) is an encoder model that combines the feature vectors of the map feature vectors and the sensor data feature vector. Specifically, the combined encoder model may generate a set of features that represent both map elements and sensor data. The combined encoder model may also include convolutional layers. The combined feature map may be the same or different resolution or size as the feature map generated by the combined encoder model (508).

Various techniques may be used to implement the various encoder models. For example, vision transformer models may be used. As another example, the encoder models may include convolutional neural network layers connected to one or more attention layers connected to additional convolutional neural network layers.

Figure 6:
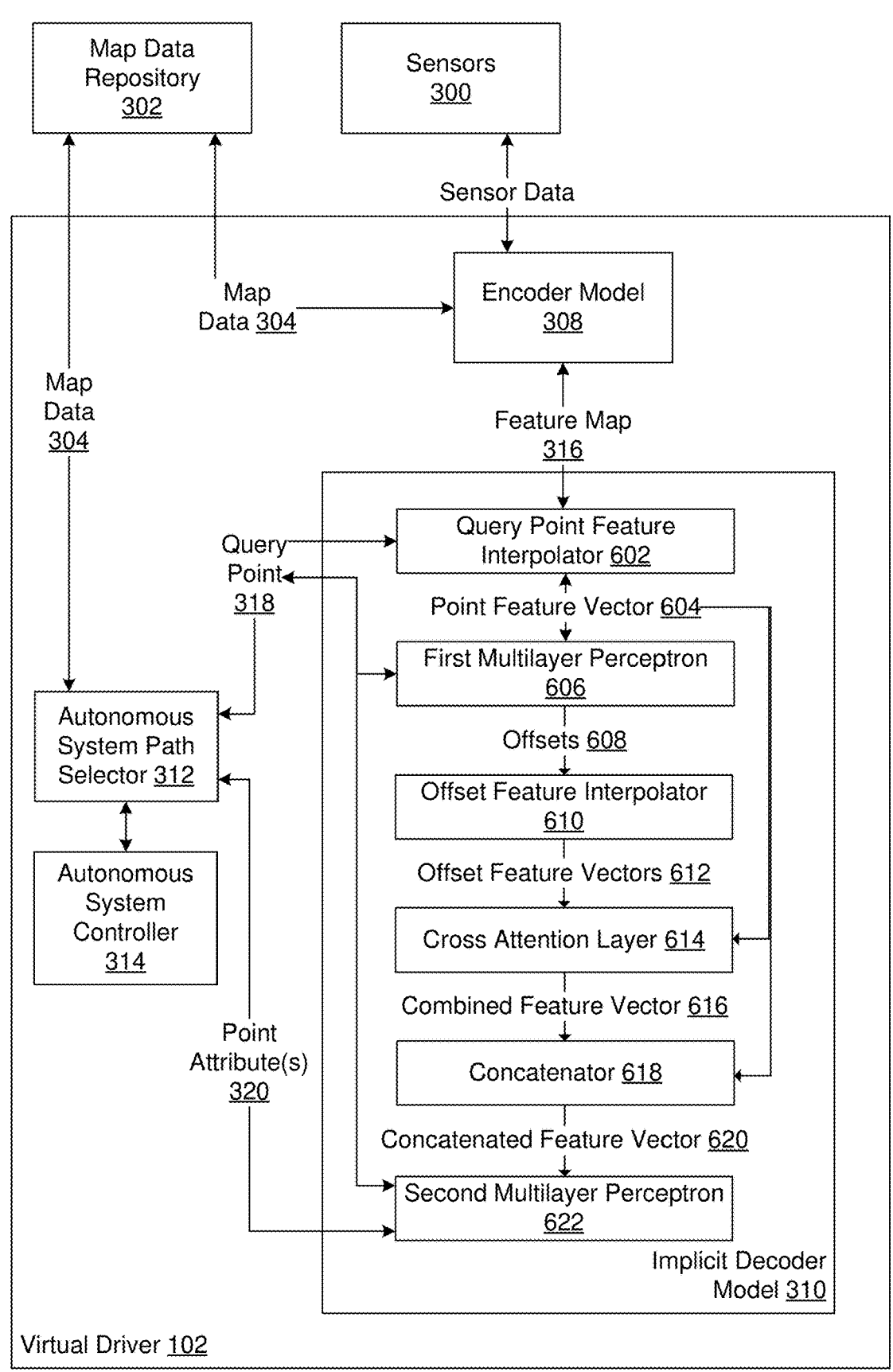
FIG. 6 shows a diagram of components of a virtual driver with an exploded view of the implicit decoder model in accordance with one or more embodiments of the invention.

FIG. 6 shows a diagram of components of a virtual driver with an exploded view of the implicit decoder model (310) in accordance with one or more embodiments of the invention. Components of FIG. 6 that have the same number as corresponding components of FIG. 3 are the same or similar to the corresponding components.

In one or more embodiments, the implicit decoder model (310) is configured to process query points in parallel with each other. Thus, for the purposes of explanation, a single query point is shown. However, the implicit decoder model (310) may perform the same pipeline across several query points.

The implicit decoder model (310) includes a query point feature interpolator (602) that is configured to interpolate a point feature vector (604) from the feature map (316). The query point feature interpolator (602) takes the geographic location as input and interpolates a new feature vector (i.e., the point feature vector (604)) from the nearest feature vectors of the feature map to the geographic location. Thus, whereas the feature map may have a predefined resolution, denoted by the size of the sub-regions of the geographic region that correspond to each grid cell, the determination of point attribute may be on any resolution.

The first multilayer perceptrons (606) are a set of neural network layers that takes, as input, the query point (318) and the point feature vector (604) and generates, as output, offsets (608). An offset specifies a distance and direction from the query point (318). Each offset corresponds to an offset location in the geographic region, whereby an offset location is a physical location in the geographic region that is offset from the query point. In one or more embodiments, the number of offsets is predefined.

The offsets (608) are processed by an offset feature interpolator (610) to generate offset feature vectors (612). The offset feature interpolator (610) may perform the same function as the query point feature interpolator (602) but for offset locations instead of the geographic location in the query point (318). For example, the same block of code may be used for the offset feature interpolator (610) as for the query point feature interpolator (602). The output of the offset feature interpolator (610) is offset feature vectors (612).

A cross attention layer (614) obtains the offset feature vectors (612) and the point feature vector (604) and generates a combined feature vector (616). The combined feature vector has aggregated features that are aggregated from the offset feature vector (612) and the point feature vector (604).

A concatenator (618) is configured to concatenate the point feature vector (604) with the combined feature vector (616). For example, the concatenation may be to append the point feature vector (604) at the end of the combined feature vector (616). The concatenator (618) generates a concatenated feature vector (620).

The concatenated feature vector (620) is used as input with the query point (318) to second multilayer perceptrons (622) that generates a set of point attributes (320) as output. The second multilayer perceptrons (622) are neural network layers that may classify the geographic location in the query point as occupied or not, provide the reverse flow, and perform other classifications.

Figure 7:
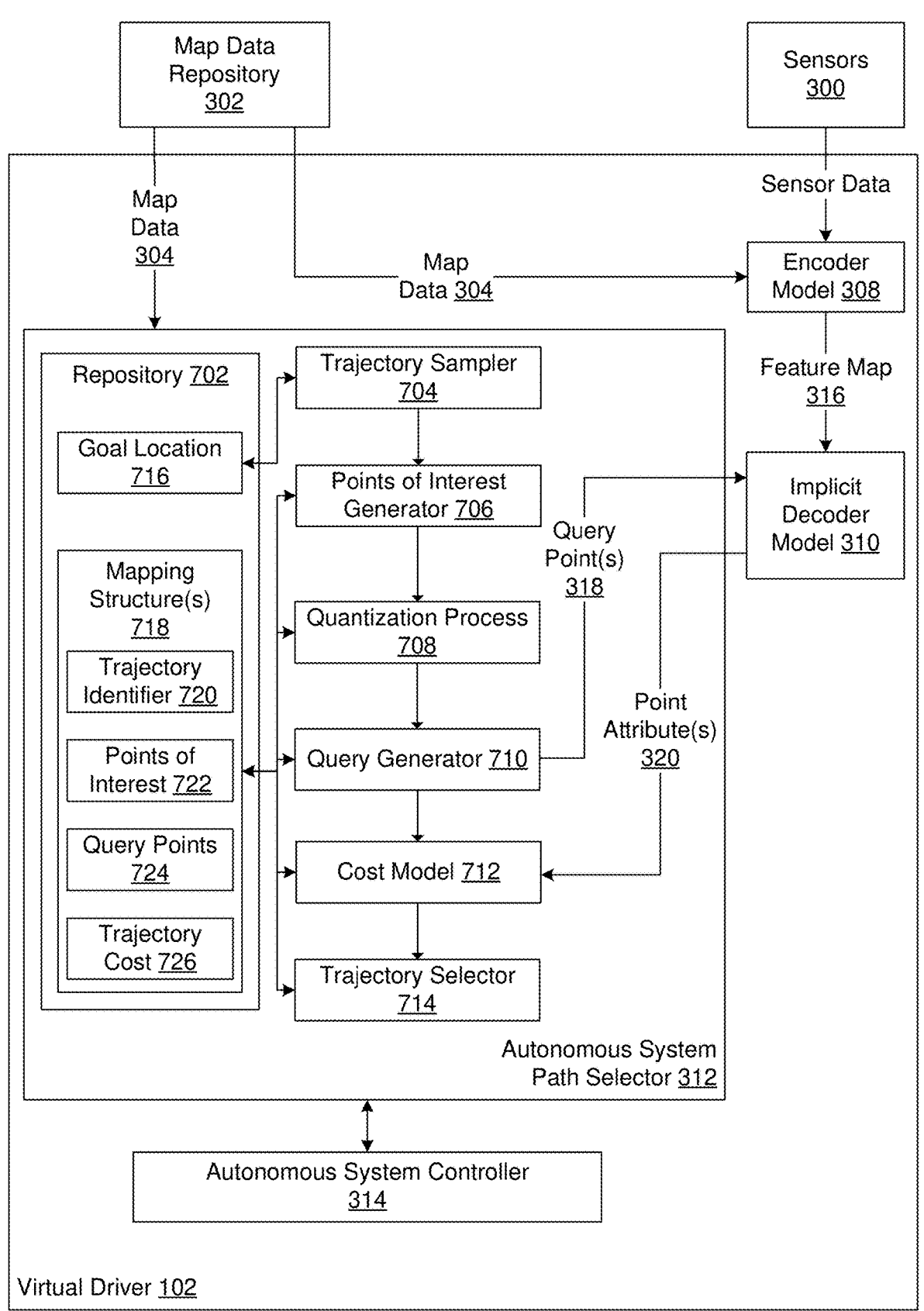
FIG. 7 shows a diagram of components of a virtual driver with an exploded view of the autonomous system path selector in accordance with one or more embodiments of the invention.

FIG. 7 shows a diagram of components of a virtual driver with an exploded view of the autonomous system path selector (312) in accordance with one or more embodiments of the invention. Components of FIG. 7 that have the same reference number as like-named components of FIG. 3 are the same as or similar to the like-named components.

A shown in FIG. 7, the autonomous system path selector includes a repository (702) connected to a trajectory sampler (704), points of interest generator (706), a quantization process (708), query generator (710), cost model (712), and trajectory selector (714). Each of these components are presented below.

The repository (702) is any type of storage unit or device for storing data. The repository (702) may include multiple, possibly heterogeneous storage units. For example, the repository (702) may include a heap structure, a file system, a database, a table, or any other type of storage.

The repository (702) includes functionality to store a goal location (716) and a mapping structure (718). The goal location (716) specifies the geographic location that is the goal of the autonomous system. As such, the goal location provides a constraint on the routing of the autonomous system so as to intersect the geographic location specified by the goal location (716). The goal location (716) may be the final destination of the autonomous system at the end of a trip. As another example, the goal location (716) may be the destination of the autonomous system after a period of time in the future (e.g., ten seconds in the future or another period in the future). As another example, the goal location (716) may be the location of the next turn.

The mapping structure (718) is a storage structure that stores a relationship between various data items. The mapping structure (718) may be multiple structures or a single structure. For example, the mapping structure (718) may be composed of one or more tables. The mapping structure (718) includes a trajectory identifier (720), points of interest (722), query points (724), and a trajectory cost (726). The trajectory identifier (726) is a unique identifier of a trajectory. As discussed above, the trajectory is a geographic path of the autonomous system from a present to the future point in time. The trajectory related to the trajectory identifier (726) may be a continuous path or a sequence of geographic positions. The trajectory identifier (726) uniquely identifies the trajectory amongst the set of trajectories being considered for the current timespan.

The points of interest (722) are a set of geographic positions along the trajectory. Points of interest (722) may be defined in continuous space. For example, points of interest (722) may not be associated with a particular grid. In one or more embodiments, the points of interest (722) are a discretization of the geographic positions of the autonomous system along the trajectory and a buffer around the geographic positions of the autonomous system. The discretization of a geographic position identifies each point within and includes the boundaries of the geographic position as being part of the points of interest. In one or more embodiments, the points of interest are defined such that the space being two adjacent points is too small to be concerned about collisions with objects. For example, a pebble or a bag may be deemed not to be large enough to have a problem with collision while the space between adjacent points may be too small to fit a small animal. Each point of interest may be associated with a corresponding time in which the autonomous vehicle is at or buffered by the point of interest along the trajectory. The time may be specified as a time offset in the future or as an actual time. For example, the time may be specified as three milliseconds in the future, two milliseconds in the future, etc. Additionally, each point of interest may be associated with the relative position of the point of interest with respect to the trajectory. For example, the relative position may be defined by horizontal or lateral buffer region, boundary of the autonomous system, or within the boundary of the autonomous system. The horizontal buffer region is the region in the front and back of the object as defined by the heading of the object. The lateral buffer region is the region to the sides of the object that are perpendicular to heading of the object.

The query points (724) are pairs specifying a geographic location and time. The query points (724) are query points (318) discussed above, that are input to the implicit decoder model (310). In one or more embodiments, query points are a quantized version of the points of interest (722). For example, query points may be specified at a lower resolution than the points of interest (722). As another example, query points may be grid cells defined in relation to a grid. A single query point may be associated with multiple points of interest, whereby the multiple points of interest may be generated from a same trajectory or from different trajectories. For example, when two possible trajectories intersect at a same time, the two trajectories may have the same query point. Thus, the implicit decoder model only operates once for the query point that is the same in different trajectories.

The mapping structure (718) relates each query point to the one or more points of interest for which the query point is created. The mapping structure (718) further relates the points of interest (722) for a trajectory to the trajectory identifier. The mapping structure (718) further relates the points of interest (722) and the locations of the points of interest with respect to the trajectory with the trajectory identifier (720). The mapping structure (718) further relates the points of interest (722) to the trajectory cost (726).

In one or more embodiments, the trajectory cost (726) is a generated cost for the trajectory. The trajectory cost (726) is a numeric value that assigns a value to the trajectory. The trajectory cost (726) may be based on one or more criteria of the trajectory. For example, trajectory cost (726) may be based on whether a collision is expected to occur with points of interest within the geographic positions, whether a collision is expected to occur with a buffer region, an amount of deviation from a direct path to the goal location, any acceleration, smoothness of the trajectory, or another criterion.

Continuing with FIG. 7, the repository is connected to a trajectory sampler (704). The trajectory sampler (704) is configured to sample from the possible trajectories to obtain a set of trajectories. Because the autonomous vehicle moves through a geographic region, the possible trajectories of the autonomous system are in continuous space and thereby unlimited. The trajectory sampler (704) may select over a hundred trajectories from the possible trajectories. The trajectory sampler may be a software process that is configured to perform the sampling. In some embodiments, the trajectory sampler includes a machine learning model or a statistical model that selects trajectories based on input about the trajectories.

The points of interest generator (706) is a software process that is configured to discretize the trajectory and generate a set of points of interest. Further, in one or more embodiments, the points of interest generator (706) is configured to add a buffer region along the trajectory and discretize the buffer region.

The quantization process (708) is a software process that is configured to quantize the points of interest. Specifically, the quantization process (708) is configured to generate a grid for the geographic region at a predefined resolution and associate each point of interest with a grid cell in the grid.

The query generator (710) is a software process that is configured to generate a query having the query points (318) based on the output of the quantization process (710). When trajectories overlap, in part, in time and geographic space, one or more of the query points may be the same. In one or more embodiments, the query generator (710) associates the same query point with the multiple trajectories through points of interest.

The cost model (712) is a software process configured to generate a trajectory cost. The trajectory cost is the cost of proceeding with the trajectory and may be the aggregation of multiple costs. For example, the trajectory cost may be an aggregation of the object aware costs and object agnostic costs. Object aware costs are one or more costs that are based on other objects in the region. For example, object aware costs may be higher if a collision occurs with an object or whether an object located within a buffer region. A collision is predicted to occur with an object when a point of interest in the bounding box of the autonomous system is predicted as occupied by another object. An object is predicted as being within the buffer region when a point of interest in the buffer region along the trajectory is predicted as occupied by another object. Object agnostic costs are costs associated with the trajectory of the autonomous system that is independent of other objects in the geographic region. For example, object agnostic costs may be associated with a smoothness of the trajectory, speed, deviation from a direct trajectory, and other types of costs. In some embodiments, the cost model (712) is a weighted aggregation function, such as a weighted average. As another example, the cost model may be a step function.

Further, in one or more embodiments, the cost model (712) may be a machine learning model that is trained using an ideal trajectory for a given scenario. For example, the trajectory cost from ideal trajectory for a given scenario may be compared against a trajectory cost for a selected trajectory for a given scenario to generate a loss. The loss may be backpropagated through the cost model (712) to generate a trajectory cost that better selects the ideal trajectory.

The trajectory selector (714) is a software process that is configured to select a trajectory from the set of trajectories according to the trajectory costs of the trajectories. In one or more embodiments, the trajectory selector (714) is configured to select a trajectory with minimal cost. The trajectory selector (714) is further configured to output the selected trajectory to the autonomous system controller to implement the selected trajectory.

FIGS. 8 and 9 show flowcharts in accordance with one or more embodiments. While the various steps in the flowcharts are described sequentially, one or more steps may be omitted, performed in different orders, or additional steps may be added. FIG. 8 shows a flowchart for motion planning with implicit occupancy for autonomous systems in accordance with one or more embodiments.

In Block 802, a set of trajectories through a geographic region is obtained for an autonomous system. The autonomous system has a goal location that is defined for the autonomous system. Possible trajectories are sampled based on a goal location to obtain a set of trajectories. The trajectories that are sampled are trajectories that are along at least one path to the goal location. The possible trajectories may be sampled using the lane graph in the map data. For example, the possible trajectories may include switching lanes, staying in the same lane, varying speeds, etc. Various sampling strategies may be used to sample the trajectories.

In Block 804, for each trajectory in the set of trajectories, a set of points of interest in the geographic region is generated to obtains sets of points of interest. Trajectories may be discretized into bounding boxes for each of multiple timesteps. For example, for each trajectory, bounding boxes around the autonomous system for each of multiple timesteps may be defined. Each trajectory may have the same set of timesteps. For example, the timesteps may be every ten milliseconds into the future. For each bounding box in the trajectory, points of interest are defined that include the edges and center of the bounding box. The points of interest discretize the bounding boxes. In one or more embodiments, points of interest are not defined according to a grid, but rather are defined from continuous space. Thus, the points of interest identify individual locations within the continuous space. In one or more embodiments, the distance between adjacent points of interest is small enough to not fit an object for which collision is a concern.

In one or more embodiments, one or more buffer regions may be added around bounding box of the autonomous system at one or more of the timesteps. For example, a lateral buffer region, perpendicular to the trajectory may be added adjacent to the sides of the bounding box of the autonomous system. A horizontal buffer region be defined that is along the heading (e.g., in the front and back of the autonomous system as defined by the orientation of the autonomous system). The buffer regions may or may not be symmetrical. For example, a buffer region on the left of the autonomous system may be smaller than a buffer region on the right of the autonomous system. Additionally, the definition of the buffer regions may be dynamically defined and dependent on the geographic region. For example, in high traffic geographic regions (e.g., urban areas), the buffer region may be smaller than in low traffic regions.

Additionally, in one or more embodiments, multiple levels of buffer regions that are at iteratively farther distances from the corresponding bounding box may be defined. For example, a first level of buffer may be defined that is within five centimeters from the bounding box, a second level of buffer may be defined that is between five centimeters and fifty centimeters, a third level of buffer region may be defined that is between fifty centimeters and one meter, etc.

Similar to the bounding boxes, the buffer regions may also be discretized into points of interest. Specifically, each location in a buffer region may be associated with a corresponding point.

Points of interest inside the bounding boxes, on the edges of the bounding boxes, and in buffer regions may be associated with a corresponding position label indicating that relative position of the point of interest with respect to the bounding box. For example, points of interest within the bounding box are on the edge of the bounding box may be associated with a first position label indicating a collision zone. Points of interest outside the bounding box may be associated with a second position label indicating a distance from the bounding box to the point of interest.

Point of interest may also be related to a timestep label indicating the timestep in which the point of interest is defined. Thus, points of interest for a first bounding box may be associated with a first timestep label, and points of interest for a second bounding box may be associated with a second timestep label that is different from the first timestep label. In one or more embodiments, the timestep labels are common across the different trajectories. Thus, if the trajectory is timewise discretized into timesteps, the points of interest for the same timestep, regardless of the trajectory for which the point of interest is generated, has the same timestep label in one or more embodiments.

The result of generating a set of point of interest for each trajectory creates multiple sets of points of interest, where each set is for an individual trajectory.

Continuing with FIG. 8, in Block 806, the sets of points of interest are quantized to obtain a set of query points in the geographic region. In one or more embodiments, a grid over the geographic region is defined. The grid partitions the geographic region into non-overlapping grid cells, whereby each grid cell is for an individual location in the geographic region. For example, the grid may have the same or different partitioning as the first axis and the second axis of the feature map described with reference to FIG. 4. The partitioning of the grid into grid cells may be at a lower resolution than the points of interest.

In one or more embodiments, for each timestep, a determination is made as to which grid cell has a point of interest in the sets of points of interest that are within the grid cell. The points of interest within the grid cell are associated with the grid cell. The grid cell is also associated with one or more timestep labels of the corresponding point of interest associated with the grid cell. Accordingly, the same grid cell may be associated with multiple points of interest, whereby the multiple points of interest may be generated for the same trajectory or for different trajectories from each other and may be associated with the same or different timestep labels.

In one or more embodiments, a set of query points are defined. In one or more embodiments, each query point is for a unique combination of grid cell and timestep, whereby the grid cell has at least one point of interest. For example, each grid cell that has at least one point of interest within the grid cell is related to an independent query point for each timestep label associated with the grid cell. Thus, if a grid cell has five points of interest within the grid cell, whereby two of the five points of interest are associated with a first timestep label and three of the five points of interest are associated with a second timestep label, then two query points may be defined. In the example, the location of a first query point is the location of the grid cell and the time in the query point is the first timestep label while the location of a second query point is also the location of the grid cell and the time in the query point is the second timestep label.

When performing the quantization process, the points of interest are related to the corresponding query points for the point of interest. Thus, a query point may be related to multiple points of interest that have the same timestep label and are within the same grid cell.

In one or more embodiments, the result of performing Block 806 is a set of query points.

In Block 808, the implicit decoder model is queried with the set of query points to obtain point attributes for the set of query points. The set of query points may be transmitted as a batch to the implicit decoder model. The operations of the implicit decoder model for a query point are described in FIG. 9. The implicit decoder model responds to the set of query points with a set of one or more point attributes for each query point of at least a subset of the set of query points. For example, each query point has a corresponding point attribute(s) for the query point. The point attribute(s) may include an indicator indicating whether a corresponding query point in the set of query points is occupied. For example, the indicator may be a binary value indicating that the query point is occupied or not occupied. As another example, the point attribute(s) may be a probability of occupancy. The probability of occupancy is the probability predicted by the implicit decoder model that that corresponding point of interest is occupied by at least one object. As another example, the point attributes may include the flow output at the query point.

In Block 810, for each trajectory of a least a subset of trajectories, the point attributes corresponding to the set of points of interest is processed to obtain a trajectory cost for the trajectory. The set of point attributes generated in response to a query point is associated with the query point and correspondingly with one or more points of interest for which the query point is defined. Thus, the query point in the set of query points is matched to a point of interest in the set of points of interest for a first trajectory, and the point attribute(s) returned for the query point is identified. The point attribute is related to the point of interest. Thus, each point of interest is related to a set of one or more point attributes indicating the predicted occupancy at the point of interest. For each trajectory, the point of interest and corresponding point attributes are process through a trajectory cost function. For object aware costs, the cost function may use both the position label and point attributes. If the position label indicates that the point of interest is within the bounding box and the point attributes indicate a high probability of occupancy, then the cost may be higher than if only points of interest in the buffer regions have a high probability of cost. Processing the point attributes may also include using the flow output. For example, the flow output for a query point may be used to estimate expected speed in lanes, to generate a trajectory cost that more accurately incentivize moving into faster lanes and avoiding slow lanes. As another example, the flow output may be used to augment the collision costs to further penalize collisions with other objects, including other actors, moving with high relative speeds. Processing the point attributes may be through the trajectory cost function. The output of the trajectory cost function is a trajectory cost for each trajectory.

In Block 812, from the set of trajectories, a selected trajectory is selected according to trajectory cost. In one or more embodiments, the trajectory is selected that has the most optimal cost amongst the set of possible trajectories. Depending on how the cost function is defined, the optimal cost may be the lowest cost.

In Block 814, the autonomous system is operated according to the selected trajectory. The autonomous system controller may initiate actuators on the autonomous system to move the autonomous system according to the selected trajectory. The virtual driver may use the occupancies of the query points to determine a current trajectory of the autonomous system that satisfies safety criteria (e.g., avoiding collisions, having stopping distance, etc.) and other criteria (e.g., shortest path, reduced number of lane changes, etc.) and is in furtherance of the moving to the destination. Then, the virtual driver may output a control signal to one or more actuators. In the real-world environment, the control signal is used by an actuator that causes the autonomous system to perform an action, such as causing the autonomous system to move in a particular direction at a particular speed or acceleration, to wait, to display a turn signal, or to perform other action. In the simulated environment, the control signal is intercepted by a simulator that simulates the actuator and the resulting action of the autonomous system. The simulator simulates the autonomous system thereby training the virtual driver. Namely, the output of simulating the autonomous system in the simulated environment may be used to evaluate the actions of the virtual driver.

The process of FIG. 8 may be repeated for each iteration in which new sensor data is received. For example, as new sensor data is received, the trajectory costs of the different trajectories are determined as described above. Once a new trajectory is selected, the previous trajectory is abandoned in favor of the new trajectory. Thus, the autonomous system may proceed to follow along an ever-changing dynamic path that reflects the current state of the geographic region.

The trajectory cost function may be trainable. Training the trajectory cost function may be performed by identifying for a given scenario, an optimal trajectory. For example, a human may select an optimal trajectory. The scenario is executed and trajectory costs for the various possible trajectories may be determined using the process described above with reference to FIG. 8 to generate a selected trajectory. The difference between the trajectory costs of the selected trajectory and the optimal trajectory may be calculated and used to generate a loss. The loss may be used to update the trajectory cost function to increase the likelihood of the optimal trajectory being selected. The training may be performed repetitively for multiple scenarios and multiple optimal trajectories.

FIG. 9 shows a flowchart for performing implicit occupancy by the implicit decoder model in accordance with one or more embodiments. The operations of FIG. 9 may be performed for in batch for the query points submitted in FIG. 8 to generate the point attributes, which are returned to the autonomous system path selector as described above with reference to FIG. 8. In one or more embodiments, prior to performing the operations of FIG. 9, a feature map is generated. The feature map is used for a current set of query points. As the autonomous system moves through the environment, physical or virtual, new feature maps are generated to accommodate the movement of traffic through the region. Thus, the generation of feature maps is performed in real-time.

In one or more embodiments, LiDAR data is obtained as a set of LiDAR sweeps of the geographic region. Each of the LiDAR sweeps includes a set of LiDAR points. As the autonomous system moves through the environment the LiDAR sensors of the autonomous system perform LiDAR sweeps. In the virtual environment, the sensor simulation model simulates the LiDAR sweeps that would be generated based on the current state of the virtual environment. Thus, LiDAR sweeps data may be provided in both the simulated and virtual environment. Binary values of grid cells in a three-dimensional LiDAR grid are set according to the positions of the grid cells being identified by a LiDAR point in the set of LiDAR points of at least one of the LiDAR sweeps in the set of LiDAR sweeps. The sensor data encoder model then executes on the LiDAR grid to encode the LiDAR grid in order to generate a sensor feature map. Although LiDAR sensor data is described as being used to generate the sensor feature map, camera images may be used. In such a scenario, the camera images may be passed through a machine learning model to generate a set of birds eye view camera feature maps of the region over time. The birds eye views may be passed through a sensor data encoding model to generate a sensor data feature map.

Similarly, a road map of the geographic region may be encoded through a map encoder model to generate a map encoding. The map encoding is a map feature map. In some embodiments, the map feature map may be pre-generated.

The map encoding and the sensor encoding are concatenated by concatenating the map feature grid with the sensor data feature grid to generate the combined feature encoding. The combined feature encoding is processed through a combined encoder model to generate the feature map.

The process of generating the feature map may be performed asynchronously with executing the implicit decoder model. In one or more embodiments, when a feature map is generated, the same feature map is used for providing point attributes responsive to the query point. Thus, for a particular query point, the same feature map is used for both the query point feature vector and the offset feature vectors.

In Block 902, a request for a point attribute at a query point matching a geographic location is received. In one or more embodiments, the implicit decoder receives a request with a set of query points (or a batch of query points). For example, the set of query points may be received from the autonomous system path selector as described in FIG. 8. The set of query points may be received as a list of query points. Each query point may include an identifier of the geographic location and a time for the geographic location. Namely, the time may be the time for which the point attribute is requested. The implicit decoder may process each query point individually and in parallel.

In Block 904, a query point feature vector is obtained from the feature map. In some embodiments, the query point feature vector may be obtained directly from the feature map. For example, the implicit decoder model may process query points at a same resolution as the feature map. In such a scenario, the location specified in the query point is used to lookup the position in the feature map corresponding to the sub-region having the location. The corresponding feature vector is returned as the query point feature vector.

In some embodiments, the query point feature vector is a combination of multiple feature vectors. The feature vectors in the feature map may be related to the centroids of the corresponding sub-region to which the feature vectors correspond. Thus, rather than being for the entire sub-region, the feature vector is related to a particular point in the sub-region. Here, related to means that the feature vector is mapped to or otherwise linked to the centroid of the sub-region (e.g., in a one-to-one mapping).

In the embodiments in which the query point feature vector is a combination of feature vectors, to obtain a query point feature vector, the following operations may be performed. From the entire set of feature vectors in the feature map, a set of feature vectors that are adjacent to the query point in the feature map is selected. Specifically, the set of feature vectors include the feature vectors that are related to the adjacent centroids of sub-regions, whereby the adjacent centroids are adjacent to the geographic location specified in the query point. For example, four, six, or nine feature vectors that are related to the four, six, or nine closest centroids may be selected.

The selected feature vectors are interpolated to obtain the query point feature vector. Bilinear interpolation is performed using the selected feature vectors to obtain the query point feature vector. Bilinear interpolation uses a weighted summation, whereby the weights are based on the relative position of the selected feature vector and the query point.

In Block 906, the query point feature vector is processed by a first set of multilayer perceptrons of a decoder model to obtain a set of offsets. The query point may be concatenated onto the query point feature vector and processed by the first set of multilayer perceptrons. The first set of multilayer perceptrons effectively learns, without identifying objects or actors, information about objects and actors that may cause the geographic location in the query point to be occupied at the future moment in time.

In Block 908, offset feature vectors are obtained from the offsets and the feature map. The offset feature vectors may be obtained in a same or similar technique to obtaining the query point feature vector. In one or more embodiments, the offsets are processed individually as follows. The offset is combined with the geographic location in the query point to obtain an offset point. The offset point is a geographic location that is the offset distance and direction from the geographic location in the query point. From the query point, the set of feature vectors is selected based on adjacency in the feature map of the set of feature vectors to the offset point specified by the offset. The set of feature vectors is interpolated using the relative position of the offset to the set of feature vectors to obtain an offset feature vector of the plurality of offset feature vectors. Selecting and interpolating the set of feature vectors is performed as described in Block 904. The result is a set of offset feature vectors.

In Block 910, the offset feature vectors and the query point feature vector are processed through a second set of multilayer perceptrons of the decoder model to generate a point attribute. The second set of multilayer perceptrons determines the point attributes for the query point.

In one or more embodiments, prior to processing the offset feature vectors and the query point feature vector through the multilayer perceptrons, preprocessing is performed. The preprocessing includes the offset feature vectors and the query point feature vector being first processed by a cross attention layer to generate an output vector. The cross attention layer combines the features of the offset feature vectors and the query point feature vector when generating the output vector, which may be processed by the multilayer perceptrons. Prior to processing the output vector by the multilayer perceptrons, further processing may be performed. The output vector may be concatenated with the query point feature vector to generate a concatenated vector. Thus, the concatenated vector includes both the output vector that is a combination of features for the offset points and the query point. Effectively, because the query point feature vector is concatenated with the output vector that is the combination, the query point feature vector has more focus in the concatenated vector. The second set of multilayer perceptrons then executes on the concatenated vector combined with the query point. Specifically, the neural network layers of the second set of multilayer perceptrons process the concatenated vector with the query point to generate the point attributes.

In Block 912, the decoder model responds to the request with the point attribute. The decoder model may provide a resulting set of point attributes for each query point in the set of query points. One of the point attributes may be the predicted occupancy of the geographic location at a time specified by the query point. Predicted occupancy may be performed by comparing a probability of occupancy with a threshold to generate a binary value. The decoder model may output the binary value or the probability. For probability, the output of the second set of multilayer perceptrons may be a value between negative infinity and infinity. The output may be passed through a sigmoid layer that changes the value to a value to a probability between zero and one. In some embodiments, multiple occupancy values are outputted. Each of the different occupancy values may correspond to a particular type of object. For example, a vector of occupancy values may be outputted, where each position in the vector corresponds to one of pedestrian, bicycle, car, truck, inanimate object, or other type of traffic. When the predicted occupancy is that the geographic location is occupied at the time, the set of point attributes may further include a reverse flow value to the query point. Specifically, the second set of multilayer perceptrons may be further trained to predict the flow to the geographic location.

Training of the system may be performed as follows. A set of training data with objects labeled may be used as input. The set of training data may include past movements of the object. Notably, instead of labeled actors and objects, point clouds to the objects may be used. If a query point lands on the object, the label for the query point is the reverse vector for the query. Thus, from the set of training data, training locations, corresponding times, and the reverse flow to the training locations are defined.

Specifically, one or more embodiments randomly sample a training query point in a geographic region of interest and in future time from the set of training data. The weights of the first set of multilayer perceptrons are initialized so that the offsets have a value close to zero. Thus, the initial set of offset points is close to the query point. Through training, the weights of the multilayer perceptrons are updated so that the offset points are more useful and may be increased. The number of offsets is a hyperparameter to the first set of multilayer perceptrons. The training sample and the training data is fed through the model. For occupancy, cross entropy loss is used. For reverse flow, the L1 loss is calculated when the sample training query point is occupied. After computing the cross entropy loss and the L1 loss, back propagation may be performed to update the weights throughout the system.

The following description is for example purposes only and not intended to limit the scope of the claims unless explicitly claimed. One or more embodiments may deviate from the implementation described below without departing from the scope of the invention.

Figure 10:
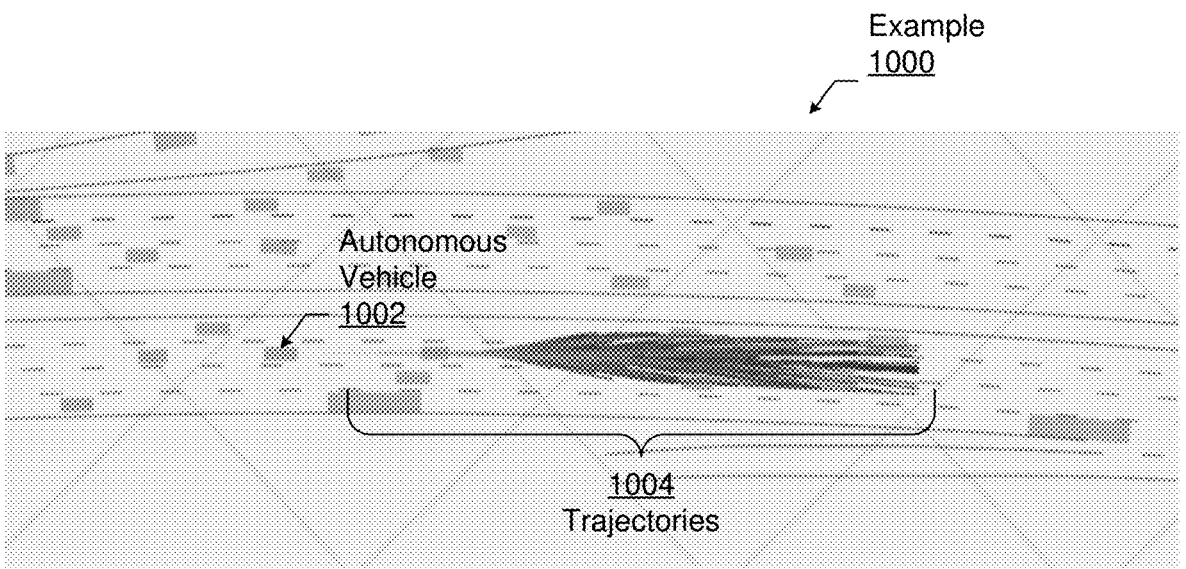
FIG. 10 shows an example of candidate trajectories in accordance with one or more embodiments.

FIG. 10 shows an example (1000) of a set of possible trajectories (1004) for an autonomous vehicle (1002). One or more embodiments builds upon two observations. The first is that the trajectories reachable space is much smaller than the full spatio-temporal volume. Namely, the amount of the geographic region for which the occupancy is determined and the time for which the occupancy is determined is much smaller than the overall geographic region through the time of the trajectory. Thus, determining occupancy may be performed for only a small number of query points as compared to the overall possible search space. As such, waiting to determine occupancy until receiving query points saves on the overall processing resources used. Further, the positions of autonomous vehicle at the various timesteps may generally be in close proximity to each other or even overlapping further saving on processing resources.

Figure 11:
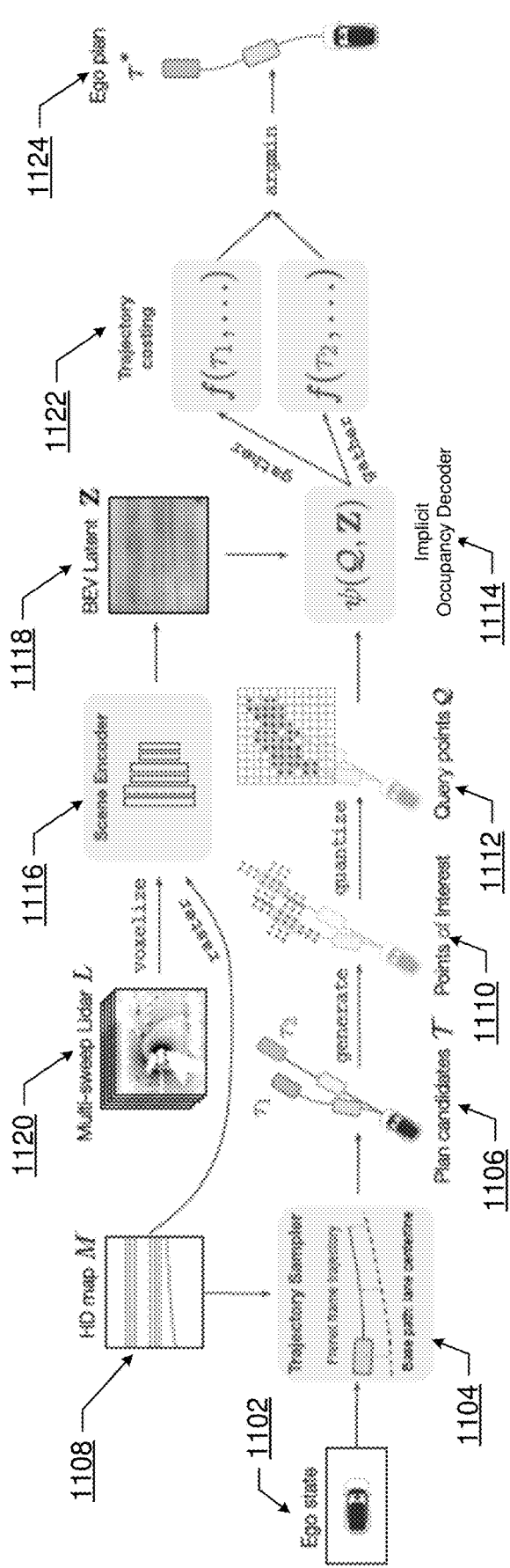
FIG. 11 shows an example of motion planning with implicit occupancy in accordance with one or more embodiments of the invention.

FIG. 11 shows an example for using an autonomous vehicle in accordance with one or more embodiments. A set of candidate trajectories $\tau{\in}\tau \in \mathcal{T}$ (1106) from the current autonomous vehicle state (1102) and going five seconds into the future is generated by the trajectory sampler (1104). In the example, the autonomous vehicle state includes the autonomous vehicle current location in birds eye view, speed, and steering. A trajectory $\tau$ is a sequence of kinematic bicycle model states for each time step in the planning horizon. The set of sampled trajectories, while small enough to enable real-time computation, encompasses a range of maneuvers, including lane following, lane changes, nudges to avoid encroaching objects, and hard brakes. The trajectory sampler (1104) may perform a sampling approach that accounts for the lane structure. For example, the trajectory sampler (1104) may use the lane centerlines from the HD map (1108) as base paths and sample longitudinal and lateral profiles. As a result, the sampled trajectories may align with appropriate lane-based driving, while incorporating lateral variations.

From the sample trajectories (1106), points of interest (1110) are defined. The goal of the points of interest (1110) may be to cover the relevant areas around the autonomous vehicle throughout the candidate trajectories (1106). In the example of FIG. 11, for every trajectory $\tau$ and time step t (e.g., sampled every 0.5 s), points within the autonomous vehicle bounding box as well as points forwards, backwards, and to the sides of the autonomous vehicle may be added to the points of interest (1110). For example, a uniform grid of points within the autonomous vehicle box at a certain resolution may be used. The uniform grid of points may be shifted forward or backward by the length of the autonomous vehicle and right or left by the width to obtain the points of interest (1110). FIG. 2 shows the process for the final time step of two trajectories.

Point quantization may be performed from the points of interest to generate the query points (1112). Because the points of interest are sampled along and around the trajectories $\mathcal{T}$, which are generated to ensure coverage of the available actions, the distance between multiple pairs of query points $\|q_j-q_k\|_2$ from different trajectories can be very small, as depicted in FIG. 10. The efficiency of the path selector may be improved by quantizing the query points with a certain spatial resolution and only querying $\psi$ with the unique set of points after quantization. The quantization resolution may be tuned to maximize efficiency without sacrificing driving performance. Empirically, the number of queries may be reduced by two orders of magnitude, from millions to tens of thousands.

The implicit occupancy model may use a scene encoder (1116) that provides a birds eye view latent representation of the environment Z (1118), and an implicit occupancy decoder $\psi$ (1114) that attends to the latent scene representation to predict occupancy probability at query points.

For the scene encoder, as input, a sequence of LiDAR point clouds containing the latest lidar sweeps (1120) may be used. Each sweep may contain a set of points with coordinates $(p_x, p_y, p_h)$, where the $(p_x, p_y)$ is the point location in the autonomous vehicle coordinate frame while $p_h$ is the height over the ground. The LIDAR may be voxelized in birds eye view to obtain a 3D tensor where the different sweeps are concatenated along the height dimension. Since the behavior of other traffic participants is generally highly influenced by the road topology, the prior knowledge stored in the HD map (1108) is used to provide cues about the regions that might be occupied and how the other traffic participants can move. More precisely, one or more embodiments may raster the polylines representing the lane centerlines in the HD map as a birds eye view binary map with the same spatial resolution as the LiDAR. The scene encoder may use two convolutional stems for processing the voxelized LiDAR and map raster respectively. The resulting feature maps are concatenated along the channel dimension and passed through a lightweight network to get a fused BEV feature map Z containing information from both modalities at half resolution of the inputs. Intuitively, the latent scene embeddings Z (1118) contain local geometry, motion and semantic descriptors from the area within the receptive field of the scene encoder (1116).

Turning to the implicit occupancy decoder (1114), leveraging the latent scene embedding Z, the implicit occupancy decoder predicts the occupancy probabilities at a set of query points $Q=\{q_j\}_{j\in[1, |Q|]}$. Each query point $q=(x, y, t){\in} \mathbb{R}^{3\ 3}$ may denote a spatio-temporal point in birds eye view at a future time t. Given a query point, the implicit occupancy decoder bilinearly interpolates a latent vector at the query point BEV location (x, y), and uses the latent vector to predict locations to attend using deformable attention. With the attended latent vector, an multilayer perceptron decoder predicts occupancy for a particular query point. The implicit occupancy decoder can attend anywhere in the birds eye view latent. Thus, since vehicles can travel very fast, by accurately predicting the occupancy into the future (e.g., at t=5 s), the model finds the original LiDAR evidence at t=0 s, which may be 150-200 meters behind.

Trajectory costing (1122) uses the output of the implicit occupancy decoder. To select an effective trajectory, various factors of driving such as collision likelihood, traffic violations, goal location, and comfort are considered. Costs may be split into agent-agnostic costs and agent-aware costs. At a high level, agent-agnostic costs describe the comfort, rule compliance, and progress of a candidate trajectory. Agent-aware costs evaluate the safety of the trajectories with respect to other agents using the outputs of the implicit occupancy model at the query point locations Q.

Object aware costs consider collisions. A collision cost considers the maximum probability of collision for each time step t of each trajectory candidate r. The probability of the occupancy at the query points within the autonomous vehicle bounding box is obtained to generate a set of probabilities. From the set of probabilities, the maximum probability of occupancy is obtained. For each trajectory, the maximum probabilities over time steps may be aggregated with a cumulative sum to further penalize trajectories that collide earlier. A longitudinal buffer cost penalizes trajectories with agents too close in front or behind the autonomous vehicle by gathering the occupancy at those locations. A linear decay may be applied to the cost based on the distance with respect to the autonomous vehicle. Similarly, lateral buffer penalizes trajectories that remain in close lateral proximity to other agents in the scene. The result is a selected trajectory (1124) for the autonomous vehicle.

Motion planning may be optimized in two stages. The implicit occupancy model may be trained in a first stage to learn to perceive and forecast. In a second stage, the occupancy model is frozen, and the cost aggregation weights $\{wi\}$ are trained to imitate an expert driver. The two-stage training may maintain the interpretability of the occupancy intermediate representation and allows the cost aggregation weights to train with stable occupancy predictions.

The occupancy model may be trained by using supervised learning with binary cross entropy loss. The training may be performed with a batch of continuous query points Q, uniformly sampled across the spatio-temporal volume.

The trajectory cost aggregation is trained such that the behavior of the autonomous system path selector imitates an expert. Because selecting the trajectory with the minimum cost from a discrete set is not a differentiable process, the max-margin loss may be used to penalize trajectories that are either unsafe or have a low cost but differ significantly from the expert driving trajectory. Intuitively, the max-margin loss incentivizes the expert trajectory $\tau_e$ to have a smaller cost J than the other trajectories. More precisely, the objective function may be as shown in Eq. 1:

$$\mathcal{L}_w = \max_{\tau}\left[\Delta J_r(x, \tau, \tau_e) + l_{im} + \sum_t [\Delta J_c^t(x, \tau, \tau_e) + l_c^t]_+\right]_+, \quad \text{(Eq. 1)}$$

where $\Delta J(x, \tau, \tau_e)=J(x, \tau e)-J(x, \tau)$ is the difference between the cost of the expert trajectory $\tau_e$ and the candidate trajectory $\tau$; $J_c^t$ is the collision cost at a particular time step into the future, and $J_r$ are the rest of the costs, aggregated; $[\ ]_+$ represents the ReLU function; and $l_{im}$ and $l_c^t$ are the imitation and safety margins, respectively. The imitation margin may be the distance between the trajectory waypoints in $\tau_e$ and $\tau$, and the safety margin is whether the candidate trajectory $\tau$ collides with any ground-truth object.

Figure 12:
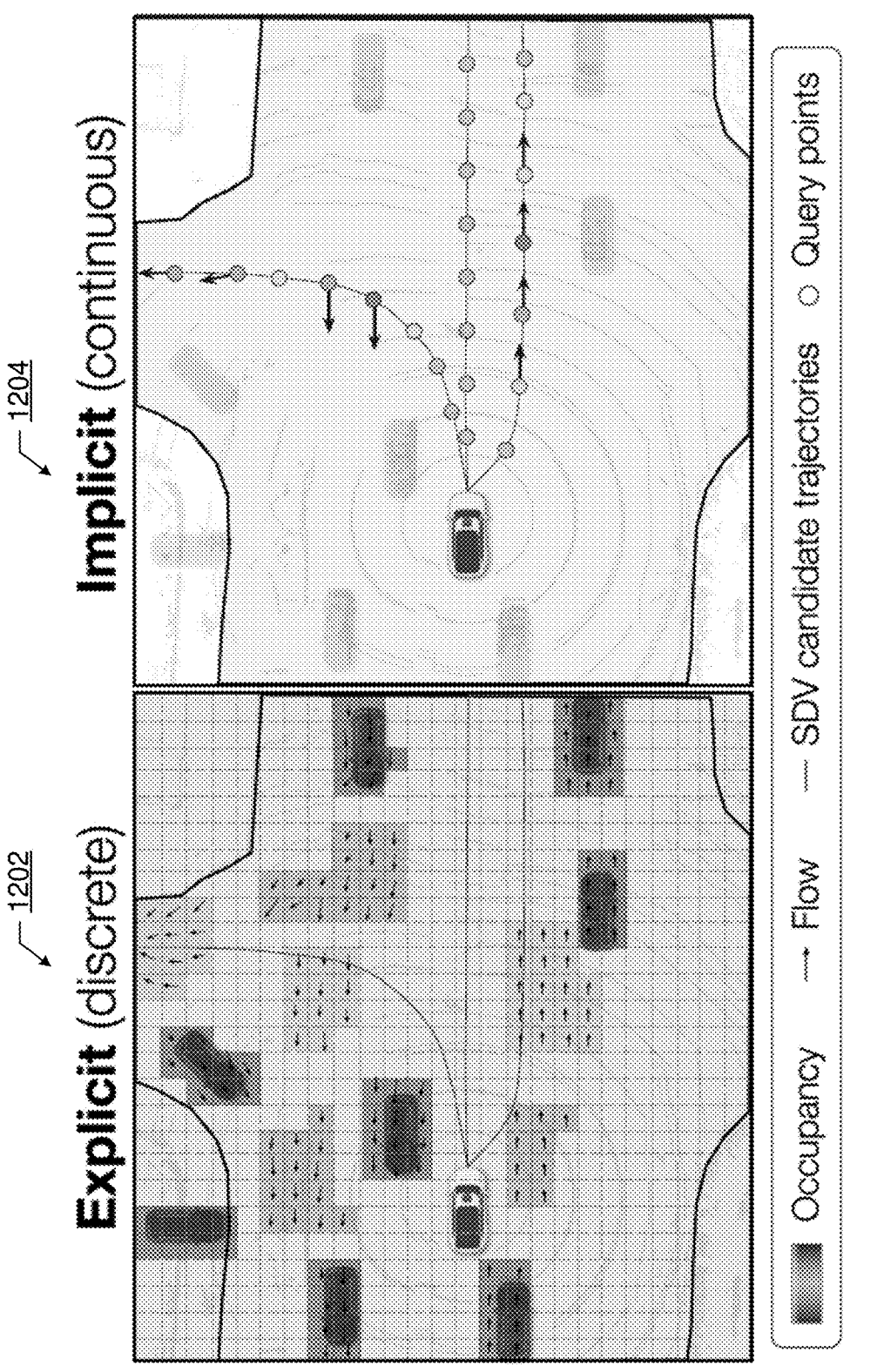
FIG. 12 shows an example diagram of explicit and implicit occupancy in accordance with one or more embodiments of the invention.

The following is a discussion of an example of an implicit occupancy model that may be used with the example autonomous system path selector presented in FIG. 11. FIG. 12 shows an example diagram of a regional map showing a difference between generating occupancy values for an entire grid (left map (1202)) versus generating implicit occupancy for a set of query points (right map (1204)). The autonomous system is an autonomous vehicle shown at the center of the respective maps. As shown, in the left map (1202), a fixed resolution grid is generated, and occupancy values are outputted for each cell in the fixed resolution grid. To accommodate the time series nature of the trajectory autonomous vehicle, multiple such grids are generated for each moment in time. The times corresponding to each grid point is fixed as well. Thus, a large amount of unused data may be generated which has both fixed resolution in time and space.

As shown in the right map (1204), implicit occupancy uses a set of query points along different trajectories (3 in the example). Each query point has a time at which the autonomous system is projected to be at the query point. The time intervals may be the same or different along the different trajectories. Further, the determination of whether the query point is occupied is not limited to a fixed resolution, but rather to the query point itself. Notably, the decoder may be further trained to output whether a specified distance around the query point is occupied. Thus, the question of occupancy may be for the query point and a threshold distance around the query point. The result is a set of values along the particular trajectories that indicate whether or not occupied and, if occupied, the reverse flow.

Figure 13:
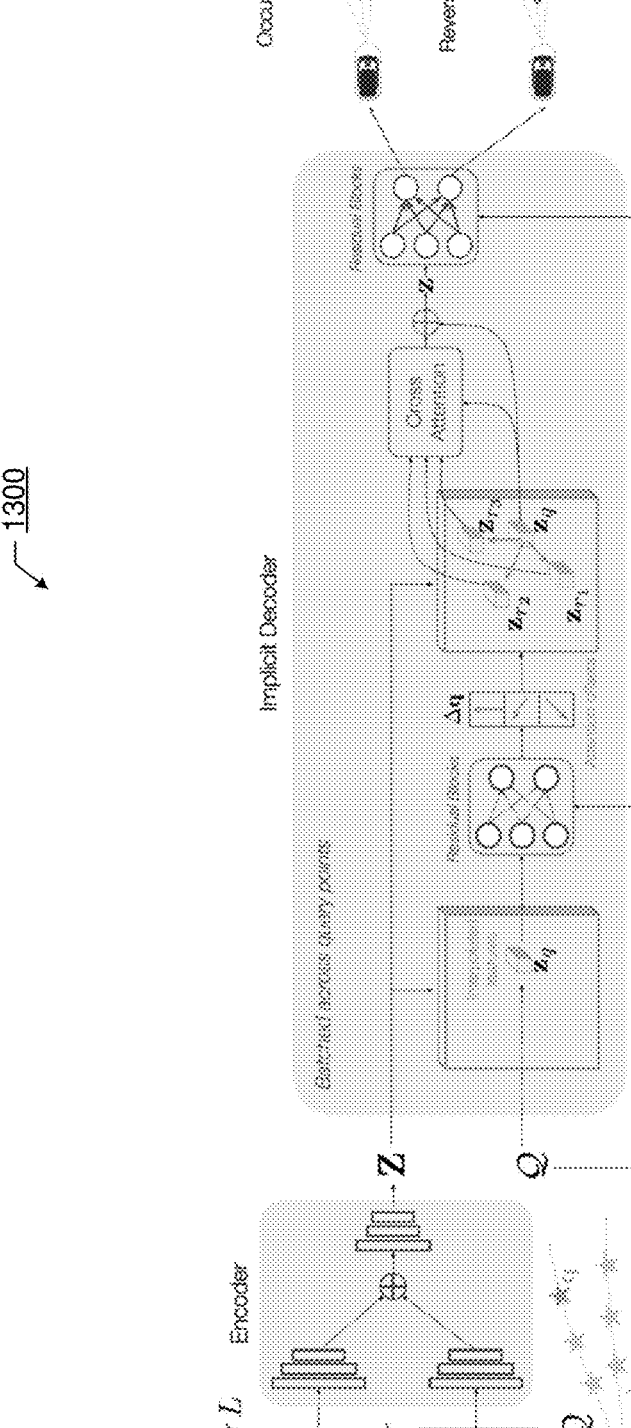
FIG. 13 shows an example implementation in accordance with one or more embodiments.

FIG. 13 shows an example implementation (1300) of the encoder model and the decoder model of the virtual driver in accordance with one or more embodiments. The example is for explanatory purposes only and not intended to limit the scope of the invention. In the example of FIG. 13, the first and second multilayer perceptron is a set of residual blocks.

Input parameterization may be performed as follows. The model may take, as input, a voxelized LiDAR representation (L) as well as a raster of the high definition (HD) map (M). For the LiDAR, let $S_t=\{s_{t-T_{history}+1}, \ldots, s_t\}$ be the sequence of the most recent $T_{history}=5$ sweeps. More precisely, $s_{t'} \in \mathbb{R}^{P\times3}$ is the LiDAR sweep ending at timestep t' containing a set of $P_{t'}$ points, each of which is described by three features: $(p_x, p_y, p_h)$. $p_x$ and $p_y$ are the location of the point relative to the self driving vehicle (SDV)'s reference frame at the current timestep $t$. The reference frame is centered at the SDV's current position and with the x-axis pointing along the direction of its heading. $p_h$ corresponds to the height of the point above the ground. Finally, L=Voxelize($S_t$) $\in \mathbb{R}^{T_{history}D\times H\times W}$, where the multi-sweep birds eye view (BEV) voxelization is performed with a discretization of D depth channels normal to the BEV plane, H height pixels and W width pixels. For the raster map, One or more embodiments take the lane centerlines C represented as polylines from the high-definition map and rasterize them on a single channel M=Raster(C)$\in \mathbb{R}^{1\times H\times W}$ with the same spatial dimensions.

The output parameterization is as follows. Let q=(x, y, t)$\in \mathbb{R}^3$ be a spatio-temporal point in BEV, at a future time t. The task is to predict the probability of occupancy o: $\mathbb{R}^3\rightarrow[0,1]$, and the flow vector f: $\mathbb{R}^3\rightarrow^2$ specifying the BEV motion of any object that occupies that location. One or more embodiments model the backwards flow for the flow vector f, as the backwards flow can capture multi-modal forward motions with a single reverse flow vector per grid cell. More concretely, backwards flow describes the motion at time t and location (x, y) as the translation vector at that location from t−1 to t, should there be an object occupying the location as shown in Eq. 2:

$$f(x, y, t) = (x', y')_{t-1} - (x, y)_t, \quad \text{(Eq. 2)}$$

where (x', y') denotes the BEV location at time t−1 of the point occupying (x, y) at time t.

Thus, the network architecture in the example implementation is shown in FIG. 13. One or more embodiments parameterize the predicted occupancy ô and flow $\hat{f}$ with a multi-head neural network $\psi$. This network takes as input the voxelized LiDAR L, raster map M, and a mini-batch Q containing |Q| spatio-temporal query points q, and estimates the occupancy $\hat{O}=\{\hat{o}(q)\}_{q\in Q}$ and flow $\hat{F}=\{\hat{f}(q)\}_{q\in Q}$ for the mini-batch in parallel as shown in Eq. 3:

$$\hat{O}, \hat{F} = \psi(L, M, Q) \quad \text{(Eq. 3)}$$

The network $\psi$ is divided into a convolutional encoder that computes scene features, and an implicit decoder that outputs the occupancy-flow estimates, as shown in FIG. 13.

The encoder in the implementation may include two convolutional stems that process the BEV LiDAR and map raster, a residual network (ResNet) that takes the concatenation of the LiDAR and map raster features and outputs multi-resolution feature planes, and a lightweight Feature Pyramid Network (FPN) that processes the feature planes. This results in a BEV feature map at half the resolution of the inputs, i.e., $$Z \in \mathbb{R}^{C\times\frac{H}{2}\times\frac{W}{2}}.$$

The feature map contains contextual features capturing the geometry, semantics, and motion of the scene. Notably, every spatial location (feature vector) in the feature map Z contains spatial information about its neighborhood (i.e., the size of the receptive field of the encoder), as well as temporal information over the past $T_{history}$ seconds. In other words, each feature vector in Z may contain important cues regarding the motion, the local road geometry, and neighboring objects.

One or more embodiments design an implicit occupancy and flow decoder that are motivated by the intuition that the occupancy at query point $q=(x, y, t) \in Q$ might be caused by a distant object moving at a fast speed prior to time t. Thus, one or more embodiments would like to use the local features around the spatio-temporal query location to suggest where to look next. For instance, there might be more expressive features about an object around its original position (at times $\{(\underline{t}-T_{history}+1), \ldots, \underline{t}\}$) since that is where the LiDAR evidence is. Neighboring traffic participants that might interact with the object occupying the query point at time t are also relevant to look for (e.g., lead vehicle, another vehicle arriving at a merging point at a similar time).

To implement these intuitions, one or more embodiments first bi-linearly interpolate the feature map Z at the query BEV location $q_{x,y}=(x, y)$ to obtain the feature vector $z_q=\text{Interp}(Z, x, y) \in^C$ that contains local information around the query. One or more embodiments then predict K reference points $\{r_1, \ldots, r_K\}$ by offsetting the initial query point $r_k=q+\Delta q_k$, where the offsets $\Delta q$ are computed by employing the fully connected ResNet-based architecture proposed by Convolutional Occupancy Networks. For each offset, one or more embodiments then obtain the corresponding features $z_{r_k}=\text{Interp}(Z, r_k)$. This can be seen as a form of deformable convolution; a layer that predicts and adds 2D offsets to the regular grid sampling locations of a convolution, and bi-linearly interpolates for feature vectors at those offset locations. To aggregate the information from the deformed sample locations, one or more embodiments use cross attention between learned linear projections of $z_q \in R^{1 \times C}$ and $Z_r=\{z_{r_1}, \ldots, z_{r_k}\} \in R^{K \times C}$. The result is the aggregated feature vector z. Finally, z and $z_q$ are concatenated, which, along with q, is processed by another fully connected ResNet-based architecture with two linear layer heads to predict occupancy logits and flow.

Training may be performed as follows. One or more embodiments train the implicit network by minimizing a linear combination of an occupancy loss and a flow loss as shown in Eq. 4:

$$L = L_o + \lambda_f L_f. \tag{Eq. 3}$$

Occupancy is supervised with binary cross entropy loss H between the predicted and the ground truth occupancy at each query point $q \in Q$, $$L_o = \frac{1}{|Q|} \sum_{q \in Q} H(o(q), \hat{o}(q)), \tag{Eq. 5}$$

In Eq. 4, $o(q)$ and $\hat{o}(q)$ are ground truth and predicted occupancy and query point q, respectively. The ground truth labels are generated by directly calculating whether or not the query point lies within one of the bounding boxes in the scene. One or more embodiments supervised the flow only for query points that belong to the foreground, i.e., points that are occupied. By doing so, the model learns to predict the motion of a query location should the query location be occupied. One or more embodiments use the $l_2$ error, where the labels are backwards flow targets from t to t−1 computed as rigid transformations between consecutive object box annotations as shown in Eq. 6:

$$L_f = \frac{1}{|Q|} \sum_{q \in Q} o(q) \|f(q) - \hat{f}(q)\|_2. \tag{Eq. 6}$$

One or more embodiments train with a batch of continuous query points Q, as opposed to points on a regular grid as previously proposed. More concretely, for each example, one or more embodiments sample |Q| query points uniformly across the spatio-temporal volume $[0, H] \times [0, W] \times [0, T]$, where $H \in R$ and $W \in R$ are the height and width of a rectangular region of interest (RoI) in BEV surrounding the SDV, and $T \in R$ is the future horizon being forecasted.

Thus, as shown, the system is trained to predict the occupancy and the flow for particular query points. One or more embodiments may provide a unified approach to joint perception and prediction for self-driving that implicitly represents occupancy and flow over time with a neural network. This queryable implicit representation can provide information to a downstream motion planner more effectively and efficiently. The implicit architecture predicts occupancy and flow more accurately than contemporary explicit approaches in both urban and highway settings.

As discussed above, the implicit occupancy does not identify objects in the geographic region to predict whether a geographic location will be occupied. However, objects may be identified for other purposes without departing from the scope of the invention.

Figure 14A:
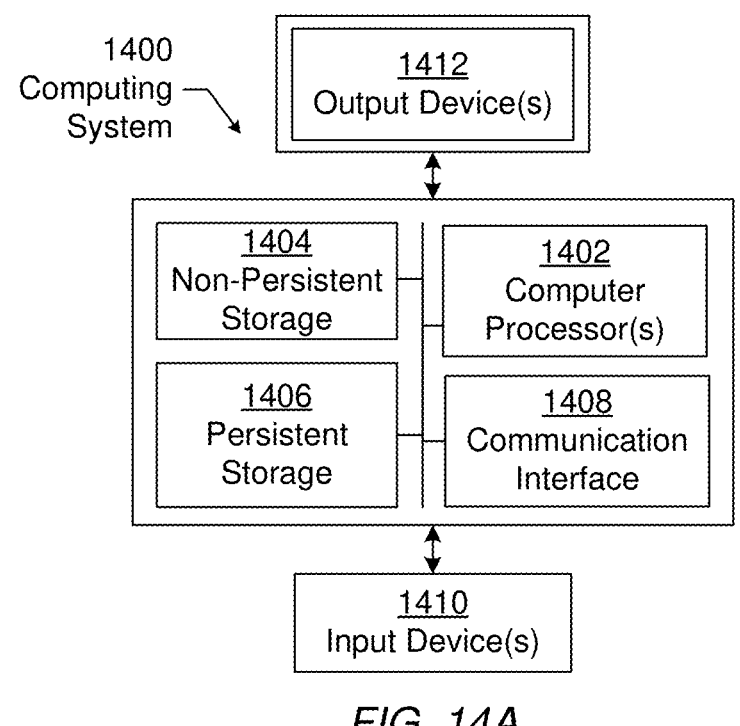
FIGS. 14A and 14B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 14A, the computing system (1400) may include one or more computer processors (1402), non-persistent storage (1404), persistent storage (1406), a communication interface (1408) (e.g., Bluetooth interface, infrared interface, network interface, optical interface, etc.), and numerous other elements and functionalities that implement the features and elements of the disclosure. The computer processor(s) (1402) may be an integrated circuit for processing instructions. The computer processor(s) may be one or more cores or micro-cores of a processor. The computer processor(s) (1402) includes one or more processors. The one or more processors may include a central processing unit (CPU), a graphics processing unit (GPU), a tensor processing unit (TPU), combinations thereof, etc.

The input devices (1410) may include a touchscreen, keyboard, mouse, microphone, touchpad, electronic pen, or any other type of input device. The input devices (1410) may receive inputs from a user that are responsive to data and messages presented by the output devices (1412). The inputs may include text input, audio input, video input, etc., which may be processed and transmitted by the computing system (1400) in accordance with the disclosure. The communication interface (1408) may include an integrated circuit for connecting the computing system (1400) to a network (not shown) (e.g., a local area network (LAN), a wide area network (WAN) such as the Internet, mobile network, or any other type of network) and/or to another device, such as another computing device.

Further, the output devices (1412) may include a display device, a printer, external storage, or any other output device. One or more of the output devices may be the same or different from the input device(s). The input and output device(s) may be locally or remotely connected to the computer processor(s) (1402). Many different types of computing systems exist, and the aforementioned input and output device(s) may take other forms. The output devices (1412) may display data and messages that are transmitted and received by the computing system (1400). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 14B:
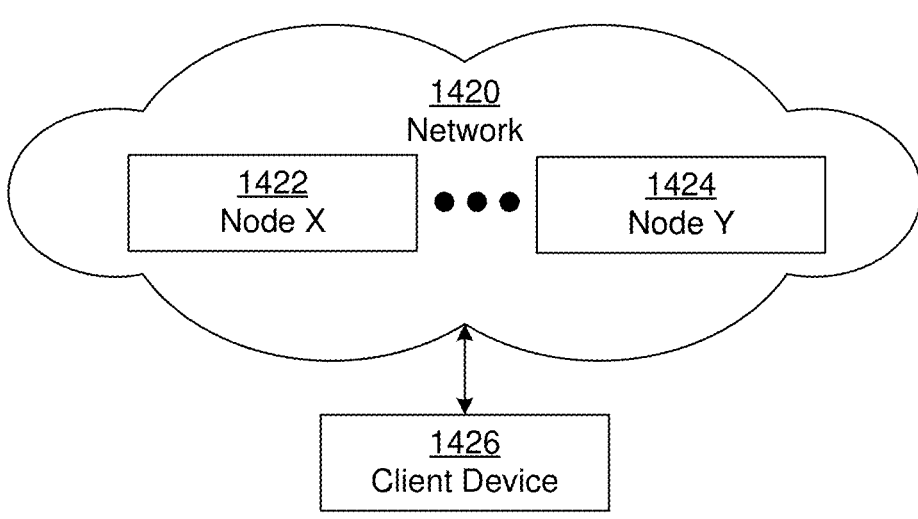

The computing system (1400) in FIG. 14A may be connected to or be a part of a network. For example, as shown in FIG. 14B, the network (1420) may include multiple nodes (e.g., node X (1422), node Y (1424)). Each node may correspond to a computing system, such as the computing system shown in FIG. 14A, or a group of nodes combined may correspond to the computing system shown in FIG. 14A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1400) may be located at a remote location and connected to the other elements over a network.

The nodes (e.g., node X (1422), node Y (1424)) in the network (1420) may be configured to provide services for a client device (1426), including receiving requests and transmitting responses to the client device (1426). For example, the nodes may be part of a cloud computing system. The client device (1426) may be a computing system, such as the computing system shown in FIG. 14A. Further, the client device (1426) may include and/or perform all or a portion of one or more embodiments.

The computing system of FIG. 14A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:

obtaining, by a virtual driver of an autonomous system, a set of trajectories through a geographic region for the autonomous system;

generating, for each trajectory in the set of trajectories, a set of points of interest in the geographic region to obtain sets of points of interest;

quantizing the sets of points of interest to obtain a set of query points in the geographic region;

querying an implicit decoder model with the set of query points to obtain a plurality of point attributes for the set of query points;

processing, for each trajectory of at least a subset of trajectories, the plurality of point attributes corresponding to the set of points of interest to obtain a trajectory cost for the trajectory;

selecting, from the set of trajectories, a selected trajectory according to trajectory cost; and outputting, by the virtual driver, a control signal according to the selected trajectory to control the autonomous system through the geographic region.

2. The method of claim 1, further comprising:
operating the autonomous system according to the selected trajectory.

3. The method of claim 1, further comprising:
sampling a plurality of possible trajectories based on a goal location to obtain the set of trajectories.

4. The method of claim 1, wherein generating the set of points of interest for a first trajectory of the set of trajectories comprises:
defining a bounding box around the autonomous system for a plurality of timesteps along the first trajectory;
defining a lateral buffer region for the autonomous system for the plurality of timesteps along the first trajectory; and
adding points within the lateral buffer region and points defining the bounding box to the set of points of interest for the first trajectory.

5. The method of claim 4, wherein generating the set of points of interest for at least one trajectory of the set of trajectories comprises:
defining a horizontal buffer region for the autonomous system for the plurality of timesteps along the first trajectory; and
adding points within the horizontal buffer region to the set of points of interest for the first trajectory.

6. The method of claim 1, further comprising:
matching a query point in the set of query points to a point of interest in the set of points of interest for a first trajectory;
identifying a point attribute in the plurality of point attributes returned by the implicit decoder model for the query point; and
relating the point attribute to the point of interest.

7. The method of claim 1, wherein the set of point attributes comprises, for each of at least a subset of the set of query points, an indicator indicating whether a corresponding query point in the set of query points is occupied.

8. The method of claim 1, wherein the set of point attributes comprises, for each of at least a subset of the set of query points, a probability of occupancy of a corresponding query point in the set of query points.

9. The method of claim 1, further comprising:
for a trajectory of the set of trajectories:
for each of at least a subset of points of interest in the set of points of interest for the trajectory:
relating, according to the quantizing, the point of interest to a corresponding query point in the set of query points to generate a mapping,
receiving a point attribute for the corresponding query point, the point attribute in the plurality of point attributes, and
associating the point attribute with the point of interest,
wherein the trajectory cost of the trajectory is based on a relative location of the point of interest with respect to the trajectory and the point attribute associated with the point of interest.

10. The method of claim 1, wherein each of at least a subset of the set of query points comprises a geographic location and a time in which an autonomous vehicle is at the geographic location according to a corresponding trajectory.

11. The method of claim 1, wherein the quantizing associates each point of interest in the sets of points of interest with a corresponding grid cell of a grid to generate the set of query points.

12. The method of claim 1, further comprising:
receiving a request for a point attribute at a query point in the set of query points matching a geographic location;
obtaining a query point feature vector from a feature map, the feature map encoding the geographic region comprising the geographic location;
processing, by a first set of multilayer perceptrons of the implicit decoder model, the query point feature vector to generate a plurality of offsets;
obtaining, from the feature map, a plurality of offset feature vectors for the plurality of offsets;
processing, by a second set of multilayer perceptrons of the implicit decoder model, the plurality of offset feature vectors, and the query point feature vector to generate the point attribute; and
responding to the request with the point attribute.

13. The method of claim 12, wherein obtaining the query point feature vector comprises:
selecting, from a plurality of feature vectors of the feature map, a first set of feature vectors that are adjacent to the query point in the feature map; and
performing bilinear interpolation using the first set of feature vectors to obtain the query point feature vector.

14. The method of claim 13, wherein obtaining the plurality of offset feature vectors comprises:
for an offset of the plurality of offsets:
selecting, from the feature map, a second set of feature vectors based on adjacency in the feature map of the second set of feature vectors to an offset point specified by the offset, and
performing bilinear interpolation using the second set of feature vectors to obtain an offset feature vector of the plurality of offset feature vectors.

15. The method of claim 12, further comprising:
encoding, by a sensor data encoder model, sensor data to obtain an encoded sensor data.

16. The method of claim 15, further comprising:
encoding a map of the geographic region through a map encoder model to generate a map encoding; and
concatenating the map encoding with the encoded sensor data to generate a combined feature encoding.

17. The method of claim 16, further comprising:
processing the combined feature encoding through a combined encoder model to generate the feature map.

18. The method of claim 12, further comprising:
processing, by a cross attention layer, the plurality of offset feature vectors and the query point feature vector to generate an output vector; and
concatenating the output vector with the query point feature vector to generate a concatenated vector,
wherein processing, by the second set of multilayer perceptrons of the implicit decoder model, the plurality of offset feature vectors and the query point feature vector is performed by processing the concatenated vector.

19. A system comprising:
a computer processor; and
non-transitory computer readable medium for causing the computer processor to perform operations comprising:
obtaining, by a virtual driver of an autonomous system, a set of trajectories through a geographic region for an autonomous system, generating, for each trajectory in the set of trajectories, a set of points of interest in the geographic region to obtain sets of points of interest, quantizing the sets of points of interest to obtain a set of query points in the geographic region, querying an implicit decoder model with the set of query points to obtain a plurality of point attributes for the set of query points, processing, for each trajectory of at least a subset of trajectories, the plurality of point attributes corresponding to the set of points of interest to obtain a trajectory cost for the trajectory, selecting, from the set of trajectories, a selected trajectory according to trajectory cost, and outputting, by the virtual driver, a control signal according to the selected trajectory to control the autonomous system through the geographic region.

20. A non-transitory computer readable medium comprising computer readable program code for causing a computer system to perform operations comprising:

obtaining, by a virtual driver of an autonomous system, a set of trajectories through a geographic region for the autonomous system;

generating, for each trajectory in the set of trajectories, a set of points of interest in the geographic region to obtain sets of points of interest;

quantizing the sets of points of interest to obtain a set of query points in the geographic region;

querying an implicit decoder model with the set of query points to obtain a plurality of point attributes for the set of query points;

processing, for each trajectory of at least a subset of trajectories, the plurality of point attributes corresponding to the set of points of interest to obtain a trajectory cost for the trajectory;

selecting, from the set of trajectories, a selected trajectory according to trajectory cost; and outputting, by the virtual driver, a control signal according to the selected trajectory to control the autonomous system through the geographic region.

* * * * *